United States Patent
Wang et al.

(10) Patent No.: US 11,953,972 B2
(45) Date of Patent: Apr. 9, 2024

(54) SELECTIVE PRIVILEGED CONTAINER AUGMENTATION

(71) Applicant: International Business Machines Corporation, Armonk, NY (US)

(72) Inventors: Yue Wang, Beijing (CN); Xin Peng Liu, Beijing (CN); Wei Wu, Beijing (CN); Liang Wang, Beijing (CN); Biao Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 17/658,120

(22) Filed: Apr. 6, 2022

(65) Prior Publication Data

US 2023/0325267 A1    Oct. 12, 2023

(51) Int. Cl.
   *G06F 11/07*    (2006.01)
   *G06F 9/455*    (2018.01)
   (Continued)

(52) U.S. Cl.
   CPC ...... *G06F 11/0715* (2013.01); *G06F 9/45558* (2013.01); *G06F 9/4881* (2013.01);
   (Continued)

(58) Field of Classification Search
   CPC ............ G06F 11/0709; G06F 11/0715; G06F 11/0751; G06F 11/0793; G06F 11/1482;
   (Continued)

(56) References Cited

U.S. PATENT DOCUMENTS

| | | | |
|---|---|---|---|
| 11,582,293 B2* | 2/2023 | Amento | H04L 67/10 |
| 2015/0007185 A1* | 1/2015 | Dey | G06F 9/52 |
| | | | 718/102 |

(Continued)

FOREIGN PATENT DOCUMENTS

| | | |
|---|---|---|
| CN | 110231976 A | 9/2019 |
| CN | 111752678 A | 10/2020 |

(Continued)

OTHER PUBLICATIONS

Wang et al., FASDQ: Fault-Tolerant Adaptive Scheduling with Dynamic QoS-Awareness in Edge Containers for Delay-Sensitive Tasks, Sensors 2021, 21(9), 2973, Apr. 23, 2021, 20 pages. https://www.mdpi.com/1424-8220/21/9/2973.

(Continued)

*Primary Examiner* — Kevin L Young
*Assistant Examiner* — Jennifer Marie Gutman
(74) *Attorney, Agent, or Firm* — Yee & Associates, P.C.

(57) ABSTRACT

Selective privileged container augmentation is provided. A target group of edge devices is selected from a plurality of edge devices to run a plurality of child tasks comprising a pending task by mapping edge device tag attributes of the plurality of edge devices to child task tag attributes of the plurality of child tasks. A privileged container corresponding to the pending task is installed in each edge device of the target group to monitor execution of a child task by a given edge device of the target group. A privileged container installation tag that corresponds to the privileged container is added to an edge device tag attribute of each edge device of the target group having the privileged container installed. A child task of the plurality of child tasks comprising the pending task is sent to a selected edge device in the target group to run the child task.

20 Claims, 17 Drawing Sheets

(51) Int. Cl.
   *G06F 9/48* (2006.01)
   *G06F 11/30* (2006.01)
(52) U.S. Cl.
   CPC .. *G06F 11/0709* (2013.01); *G06F 2009/4557* (2013.01); *G06F 11/3006* (2013.01)
(58) Field of Classification Search
   CPC .............. G06F 11/3006; G06F 11/302; G06F 9/45558; G06F 9/4881; G06F 2009/4557; G06F 2209/45595; G06F 8/61; G06F 2201/815
   See application file for complete search history.

(56) References Cited

U.S. PATENT DOCUMENTS

| | | | |
|---|---|---|---|
| 2017/0147333 A1* | 5/2017 | Bregler | G06F 9/44521 |
| 2020/0371893 A1 | 11/2020 | Bhorkar et al. | |
| 2021/0011765 A1 | 1/2021 | Doshi et al. | |
| 2021/0049027 A1* | 2/2021 | Lagerholm | G06F 11/3065 |
| 2021/0100070 A1 | 4/2021 | Sabella et al. | |
| 2022/0291956 A1* | 9/2022 | Zhang | G06F 9/4881 |

FOREIGN PATENT DOCUMENTS

| | | |
|---|---|---|
| CN | 112631759 A | 4/2021 |
| CN | 112740181 A | 4/2021 |
| CN | 113114715 A | 7/2021 |
| CN | 113364633 A | 9/2021 |
| CN | 114257599 A | 3/2022 |

OTHER PUBLICATIONS

Block et al., "Increasing Security of Istio Deployments by Removing the Need for Privileged Containers," published Sep. 17, 2018, copyright Red Hat, Inc. 2022, 4 pages. https://cloud.redhat.com/blog/increasing-security-of-istio-deployments-by-removing-the-need-for-privileged-containers.

Fiser et al., "Why a Privileged Container in Docker Is a Bad Idea," published Dec. 20, 2019, copyright copyright Trend Micro Incorporated 2022, 14 pages. https://www.trendmicro.com/en_us/research/19/l/why-running-a-privileged-container-in-docker-is-a-bad-idea.html.

"Python Troubleshooting," IBM Observability by Instana, copyright IBM Corporation 2021, 2022, accessed Mar. 7, 2022, 7 pages. https://www.ibm.com/docs/en/obi/current?topic=package-python-troubleshooting#autotrace-is-crashing-a-python-process.

Mell et al., "The NIST Definition of Cloud Computing," Computer Security Division, National Institute of Standards and Technology, Jan. 2011, 7 pages.

PCT International Search Report and Written Opinion, dated Jun. 15, 2023, regarding Application No. PCT/CN2023/083380, 7 pages.

* cited by examiner

EDGE DEVICE GROUP ASSIGNMENT TABLE 700

| TASK INSTANCE ID 702 | TASK TEMPLATE ID 704 | CLUSTER ID 706 | CHILD TASK ID 708 | EDGE DEVICE ID 710 | EDGE DEVICE GROUP 712 |
|---|---|---|---|---|---|
| Task_Instance_1_1 | Task_1 | Cluster_1 | ChildTask_1_1 | A | *TARGET GROUP* |
| | | | ChildTask_1_2 | B | *TARGET GROUP* |
| | | | ChildTask_1_3 | C | |
| Task_Instance_1_2 | Task_2 | Cluster_2 | ChildTask_2_1 | D | *TARGET GROUP* |
| | | | ChildTask_2_2 | E | |
| Task_Instance_1_3 | Task_2 | Cluster_3 | ChildTask_2_1 | F | NORMAL GROUP |
| | | | ChildTask_2_2 | G | |
| Task_Instance_1_4 | Task_1 | Cluster_4 | ChildTask_1_1 | H | NORMAL GROUP |
| | | | ChildTask_1_2 | I | |
| | | | ChildTask_1_3 | J | |
| ○ ○ ○ | ○ ○ ○ | ○ ○ ○ | ○ ○ ○ | ○ ○ ○ | ○ ○ ○ |

FIG. 7

CHILD TASK RESULT TABLE 900

| TASK INSTANCE ID 902 | TASK INSTANCE RESULT 904 | TASK TEMPLATE ID 906 | CLUSTER ID 908 | CHILD TASK ID 910 | EDGE DEVICE ID 912 | CHILD TASK RESULT 914 | EDGE DEVICE GROUP 916 |
|---|---|---|---|---|---|---|---|
| Task_Instance_1_1 | PASS | Task_1 | Cluster_1 | ChildTask_1_1 | A | PASS | TARGET GROUP |
|  |  |  |  | ChildTask_1_2 | B | PASS | TARGET GROUP |
|  |  |  |  | ChildTask_1_3 | C | PASS | TARGET GROUP |
| Task_Instance_1_2 | FAIL | Task_2 | Cluster_2 | ChildTask_2_1 | D | FAIL | TARGET GROUP |
|  |  |  |  | ChildTask_2_2 | E | FAIL | TARGET GROUP |
| Task_Instance_1_3 | PASS | Task_2 | Cluster_3 | ChildTask_2_1 | F | PASS | NORMAL GROUP |
|  |  |  |  | ChildTask_2_2 | G | PASS | NORMAL GROUP |
| Task_Instance_1_4 | PASS | Task_1 | Cluster_4 | ChildTask_1_1 | H | PASS | NORMAL GROUP |
|  |  |  |  | ChildTask_1_2 | I | PASS | NORMAL GROUP |
|  |  |  |  | ChildTask_1_3 | J | PASS | NORMAL GROUP |
| ○ ○ ○ | ○ ○ ○ | ○ ○ ○ | ○ ○ ○ | ○ ○ ○ | ○ ○ ○ | ○ ○ ○ | ○ ○ ○ |

PRIVILEGED CONTAINER INSTALLER ACTION TABLE 1200

| TASK INSTANCE ID 1202 | TASK INSTANCE RESULT 1204 | TASK TEMPLATE ID 1206 | CLUSTER ID 1208 | CHILD TASK ID 1210 | EDGE DEVICE ID 1212 | CHILD TASK RESULT 1214 | PRIVILEGED CONTAINER INSTALLER ACTION 1216 | EDGE DEVICE GROUP 1218 |
|---|---|---|---|---|---|---|---|---|
| Task_Instance_1_1 | PASS | Task_1 | Cluster_1 | ChildTask_1_1 | A | PASS | N/A | TARGET GROUP |
| | | | | ChildTask_1_2 | B | PASS | N/A | TARGET GROUP |
| | | | | ChildTask_1_3 | C | PASS | N/A | TARGET GROUP |
| Task_Instance_1_2 | FAIL | Task_2 | Cluster_2 | ChildTask_2_1 | D | FAIL | *REMOVE* PRIVILEGED CONTAINER | TARGET GROUP |
| | | | | ChildTask_2_2 | E | FAIL | *REMOVE* PRIVILEGED CONTAINER | TARGET GROUP |
| Task_Instance_1_3 | PASS | Task_2 | Cluster_3 | ChildTask_2_1 | F | PASS | N/A | NORMAL GROUP |
| | | | | ChildTask_2_2 | G | PASS | N/A | NORMAL GROUP |
| Task_Instance_1_4 | PASS | Task_1 | Cluster_4 | ChildTask_1_1 | H | PASS | *ADD* PRIVILEGED CONTAINER | NORMAL GROUP |
| | | | | ChildTask_1_2 | I | PASS | *ADD* PRIVILEGED CONTAINER | NORMAL GROUP |
| | | | | ChildTask_1_3 | J | PASS | *ADD* PRIVILEGED CONTAINER | NORMAL GROUP |
| ○ ○ ○ | ○ ○ ○ | ○ ○ ○ | ○ ○ ○ | ○ ○ ○ | ○ ○ ○ | ○ ○ ○ | ○ ○ ○ | ○ ○ ○ |

SELECTIVE PRIVILEGED CONTAINER AUGMENTATION

BACKGROUND

1. Field

The disclosure relates generally to edge computing and more specifically to enabling selective privileged container augmentation of edge devices in an edge computing architecture.

2. Description of the Related Art

Edge computing acts on data at the source. Edge computing is a distributed computing architecture that brings applications and services closer to data sources, such as, for example, Internet of Things (IoT) devices. However, IoT is only one specific instantiation of edge computing. This proximity to data at its source can deliver benefits such as decreased response times and increased bandwidth availability. For example, by moving applications and services to the edge, it is possible to provide content caching, service delivery, persistent data storage, IoT management, and the like, closer to requesting clients, which results in better response times and transfer rates.

With the development and spread of cloud computing and IoT technologies, edge computing is becoming the next new emerging direction to unleash greater computation capabilities. Edge computing is built on cloud computing, especially container infrastructures, as more and more diverse types of edge devices provide a capability to inject code into application containers.

However, running application containers within edge devices brings challenges, such as, for example, security and reliability issues, among others. In order to control such edge device containers, code injection of additional modules or containers is needed to provide monitoring, security, and other capabilities. However, these code injections of extra modules or containers need a privilege change, which can greatly affect stability of the application containers running on edge devices (e.g., cause the application containers to fail task execution).

SUMMARY

According to one illustrative embodiment, a computer-implemented method for selective privileged container augmentation is provided. A computer selects a target group of edge devices from a plurality of available edge devices to run a plurality of child tasks comprising a pending task by mapping edge device tag attributes of the plurality of available edge devices to child task tag attributes of the plurality of child tasks. The computer installs a privileged container corresponding to the pending task in each respective edge device of the target group of edge devices to monitor execution of a child task by an application container in a given edge device of the target group of edge devices. The computer adds a privileged container installation tag that corresponds to the privileged container to an edge device tag attribute of each respective edge device of the target group of edge devices having the privileged container installed. The computer sends a given child task of the plurality of child tasks comprising the pending task to a selected edge device in the target group of edge devices to run the given child task. According to other illustrative embodiments, a computer system and computer program product for selective privileged container augmentation are provided.

The illustrative embodiments also remove the privileged container from each respective edge device of the target group of edge devices that failed to execute the plurality of child tasks in response to determining that child task results indicated failed execution of the plurality of child tasks by the target group of edge devices. As a result, the illustrative embodiments provide selective, task-related privileged container augmentation to decrease application container task failures on edge devices. Also, this selective, task-related privileged container augmentation of the illustrative embodiments saves edge device computation resources, which increases performance of edge computing.

BRIEF DESCRIPTION OF THE DRAWINGS

FIG. 7 is a diagram illustrating an example of an edge device group assignment table in accordance with an illustrative embodiment;

FIG. 9 is a diagram illustrating an example of a child task result table in accordance with an illustrative embodiment;

FIG. 12 is a diagram illustrating an example of a privileged container installer action table in accordance with an illustrative embodiment;

DETAILED DESCRIPTION

Figure 1:
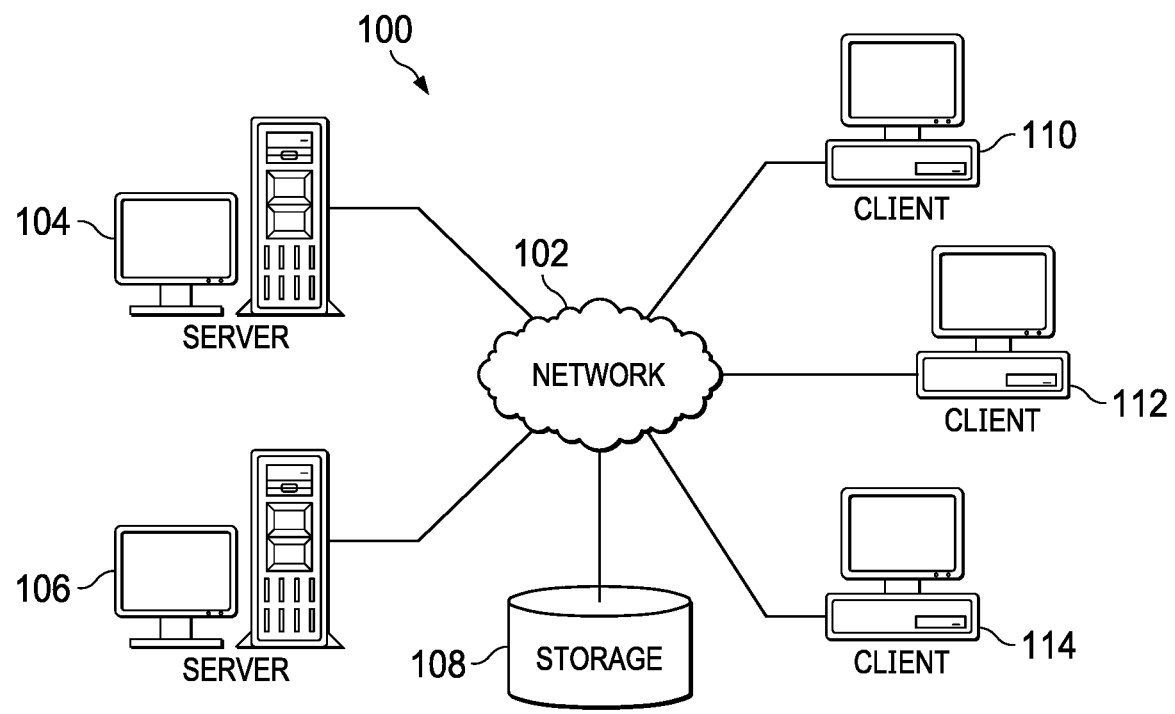
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple computing nodes in one or more cloud computing environments. Alternatively, server 104 and server 106 may each represent a cluster of servers in one or more data centers.

In addition, server 104 and server 106 provide the edge device management services of illustrative embodiments. Client 110, client 112, and client 114 also connect to network 102. Clients 110, 112, and 114 are client edge devices of server 104 and server 106 and comprise an edge computing environment in this example. In this example, clients 110, 112, and 114 are shown as desktop or personal computers with wire communication links to network 102. However, it should be noted that clients 110, 112, and 114 are examples only and may represent other types of edge data processing systems, such as, for example, network computers, laptop computers, handheld computers, smart phones, smart watches, smart glasses, smart televisions, smart vehicles, smart appliances, virtual reality devices, gaming devices, kiosks, and the like, with wire or wireless communication links to network 102.

Each of clients 110, 112, and 114 is equipped with an application container that is capable of performing one or more tasks associated with an application workload. In addition, server 104 and server 106 selectively augment clients 110, 112, and 114 with privileged containers, which monitor execution of the application workload tasks by the application containers running on clients 110, 112, and 114. Further, server 104 and server 106 selectively assign tasks to clients 110, 112, and 114 based on privileged container compatibility with certain tasks. For example, a particular privileged container can be incompatible with a particular task. In other words, that particular task will fail to execute properly on an edge device when that particular privileged container is installed on that edge device. As a result, server 104 or server 106 will not assign that particular task to an edge device when that edge device has that particular privileged container currently installed. Furthermore, server 104 and server 106 will automatically remove an installed privileged container from an edge device that failed to properly execute an assigned task.

Storage 108 is a network storage device capable of storing any type of data in a structured format or an unstructured format. In addition, storage 108 may represent a plurality of network storage devices. Further, storage 108 may store identifiers and network addresses for a plurality of client edge devices, identifiers for a plurality of tasks, task templates, task tag attributes, client edge device tag attributes, task execution results, and the like. Furthermore, storage 108 may store other types of data, such as authentication or credential data that may include usernames, passwords, and the like associated with, for example, system administrators, security analysts, or the like.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
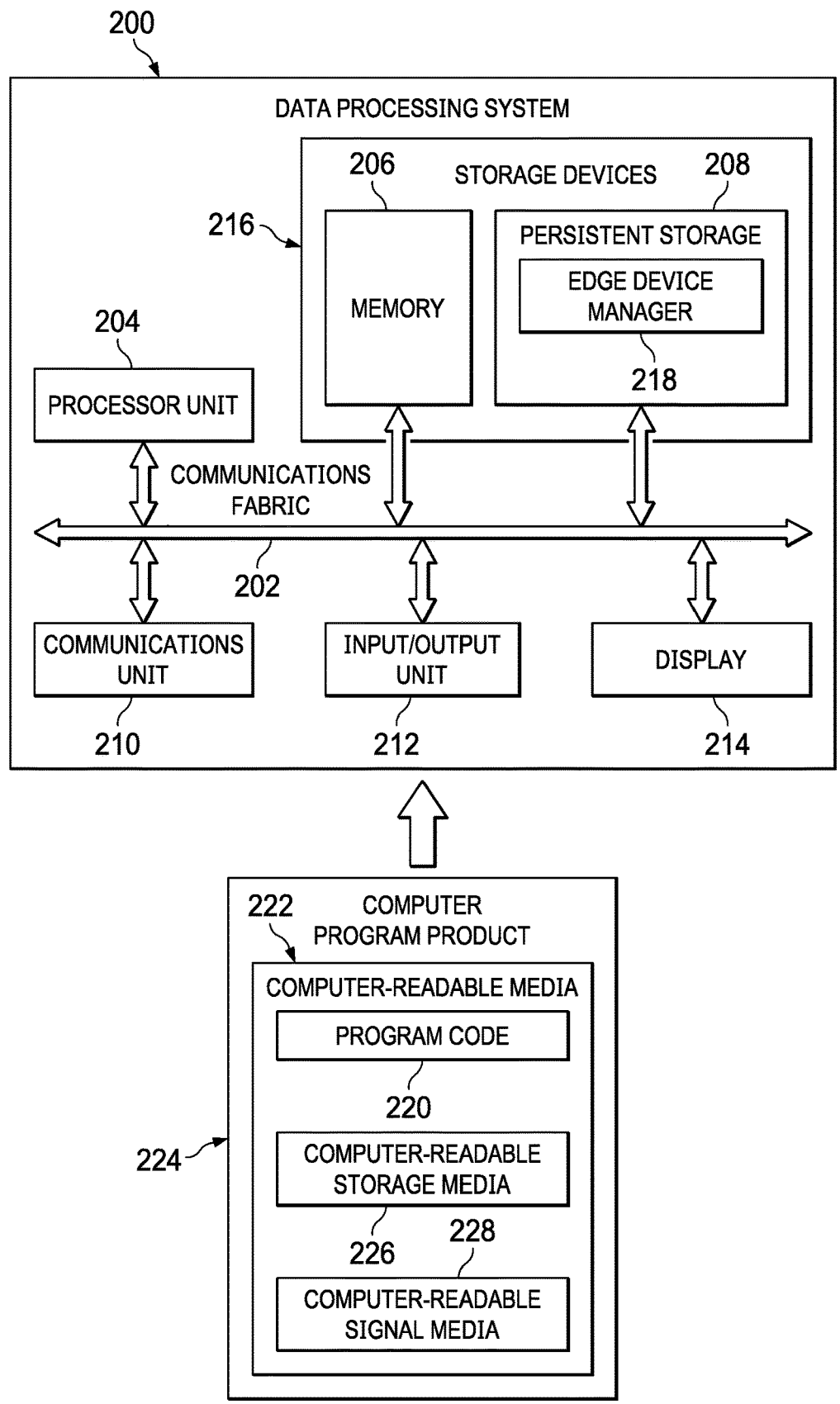
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the edge device management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores edge device manager 218. However, it should be noted that even though edge device manager 218 is illustrated as residing in persistent storage 208, in an alternative illustrative embodiment edge device manager 218 may be a separate component of data processing system 200. For example, edge device manager 218 may be a hardware component coupled to communication fabric 202 or a combination of hardware and software components. In another alternative illustrative embodiment, a first set of components of edge device manager 218 may be located in data processing system 200 and a second set of components of edge device manager 218 may be located in a second data processing system, such as, for example, server 106.

Edge device manager 218 controls the process of improving edge computing performance by enabling dynamic task assignment to edge devices, selective privileged container augmentation of edge devices, and automatic failed task recovery of application workloads on edge devices within an edge computing environment. Edge device manager 218 is comprised of a plurality of different components, such as, for example, a cluster definer, a target group analyzer, a privileged container installer, a task sender, a task result receiver, an incompatibility checker, and the like. Edge device manager 218 utilizes the target group analyzer of the cluster definer component to analyze a pending task comprised of a plurality of child tasks and to select a group of edge devices as a target edge device group to install a privileged container corresponding to the pending task in each respective edge device of the target edge device group in order to monitor execution of the plurality of child tasks by an application container on each respective edge device of the target edge device group. The privileged container monitors execution of a particular child task by collecting data from the application container performing that particular child task to determine child task execution result of either pass or fail.

Edge device manager 218 utilizes the privileged container installer to install the privileged container in the edge devices of the target edge device group. In addition, edge device manager 218 utilizes the privileged container installer to remove the privileged container from failed task edge devices in the target edge device group. Further, edge device manager 218 utilizes the privileged container installer to install the privileged container in other edge devices in a normal edge device group that will rerun the failed tasks for automatic failed task recovery. Furthermore, edge device manager 218 adds privileged container installation tags to edge device tag attributes corresponding to the other edge devices in the normal edge device group where the privileged containers were installed.

Edge device manager 218 utilizes the cluster definer to define a cluster of edge devices in the normal edge device group to rerun the failed tasks of the target edge device group. Furthermore, edge device manager 218 utilizes the cluster definer to select edge devices for pending tasks based on whether a child task tag attribute corresponding to a particular child task of a pending task includes a privileged container incompatibility tag, which indicates that a particular privileged container is incompatible (e.g., will not work) with that particular child task. In other words, if a particular edge device has that particular privileged container currently installed, then the cluster definer will not select that particular edge device to run that particular child task because of the incompatibility. For example, if an unsuccessful task execution is detected, then illustrative embodiments mark the incompatibility of that particular privileged container to that particular type of task and distribute the installation of that particular privileged container to edge devices that are able to execute that particular type of task. Moreover, illustrative embodiments uninstall that privileged container only from those failed task edge devices.

As a result, data processing system 200 operates as a special purpose computer system in which edge device manager 218 in data processing system 200 enables selective privileged container augmentation of edge devices in an edge computing architecture to decrease task failure and increases performance of the edge computing architecture by performing automatic failed task recovery. In particular, edge device manager 218 transforms data processing system 200 into a special purpose computer system as compared to currently available general computer systems that do not have edge device manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
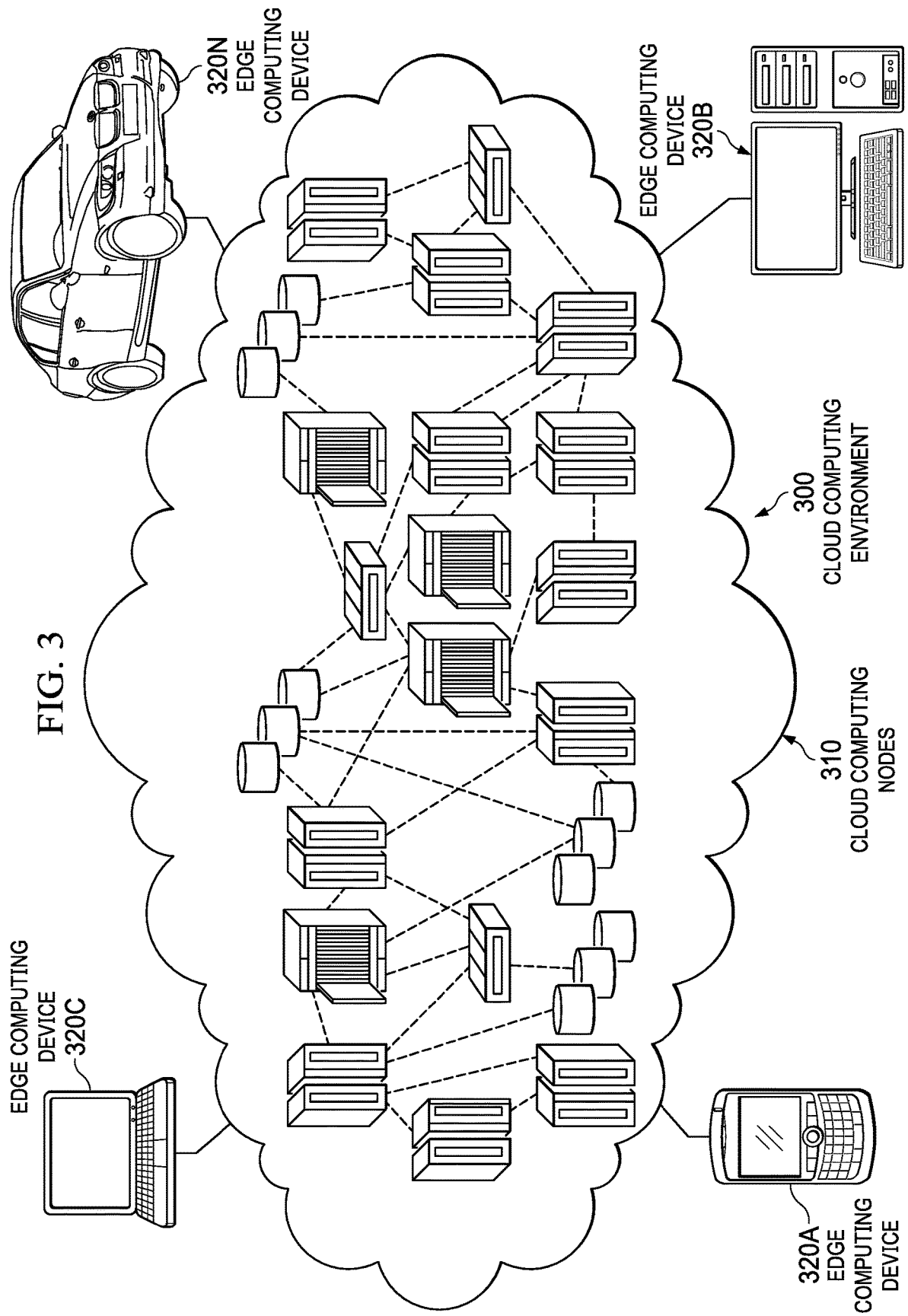
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of cloud computing nodes 310 with which edge computing devices, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Edge computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device. It is understood that cloud computing environment 300 is intended to be an illustrative example only and not as a limitation on different illustrative embodiments.

Figure 4:
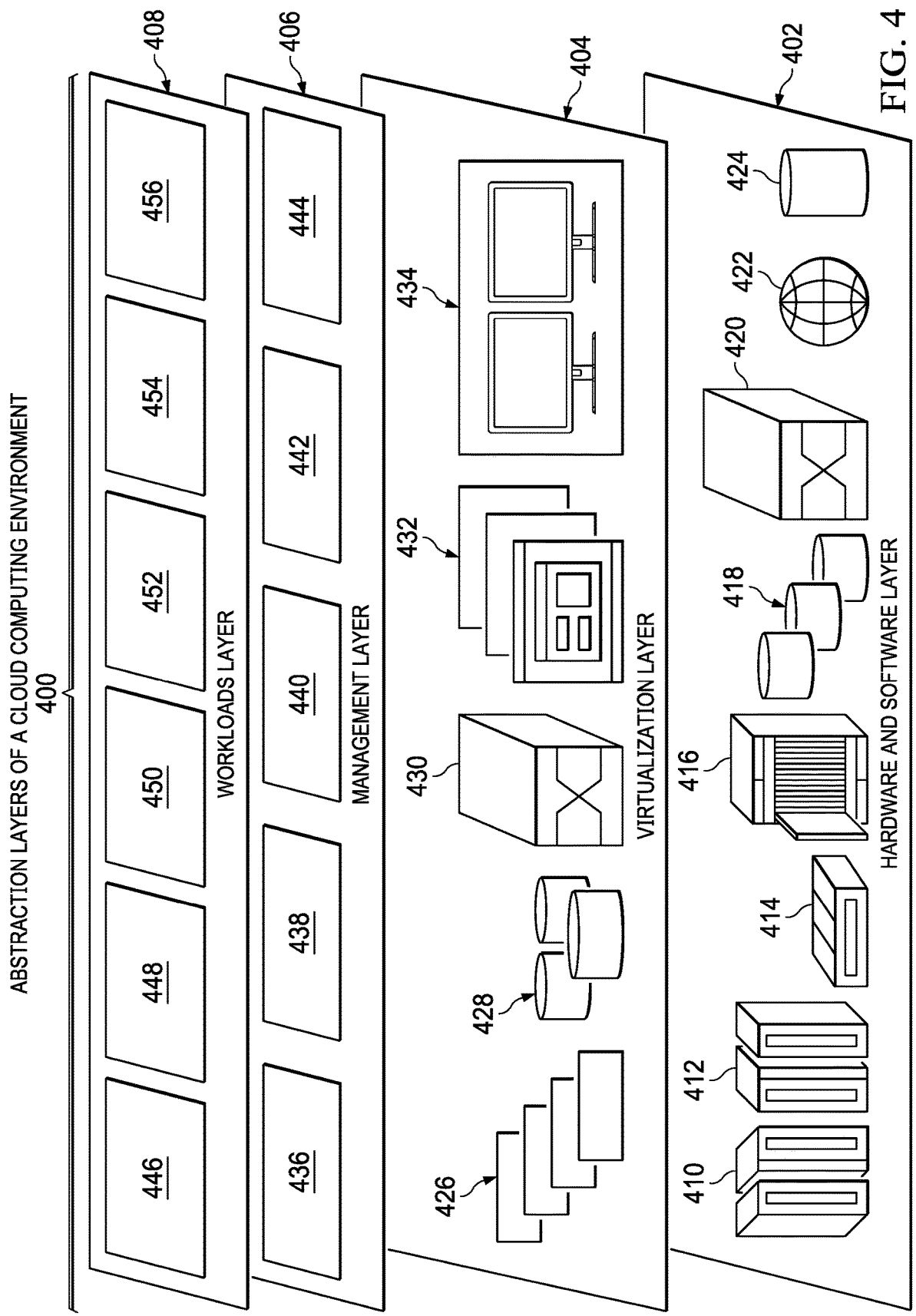
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and edge device management 456.

Assisted by artificial intelligence controllers, edge computing has now been widely adopted by many industries involving dedicated programming for controlling edge devices. Increasingly, different types of tasks corresponding to application workloads will run on these edge devices. Further, coordination and interaction among these tasks running on these edge devices may exist.

A privileged container, which has root privilege capabilities to probe different resources (e.g., an application container) of an edge device, needs to be installed in these edge devices. For example, the privileged container can be used to monitor execution of a task corresponding to a workload of an application container in an edge device. If the privileged container injects code into the application container, this code injection can cause the application container to restart one or more times, creating an issue that needs to be fixed. For example, the privileged container probes the application container and detects that the application type in the application container is of a particular programming language. The privileged container injects monitoring code of that particular programming language into the application container, which causes that application container to restart and may cause the application in the application container to stop working correctly because of a library conflict.

Illustrative embodiments enable dynamic privileged container augmentation of selected edge devices in the edge computing architecture. The edge device manager of illustrative embodiments receives a task template corresponding to a pending task, which is comprised of a plurality of child tasks. A target group analyzer in a cluster definer of the edge device manager analyzes the task template of the pending task to identify the plurality of child tasks. The target group analyzer selects a group of edge devices to run the plurality of child tasks comprising the pending task by mapping edge device tag attributes of edge devices in the edge computing architecture to child task tag attributes of the plurality of child tasks comprising the pending task.

Afterward, a cluster definer of the edge device manager defines a target group of edge devices to run the plurality of child task comprising the pending task based on the group of edge devices selected by the target group analyzer. Then, a privileged container installer of the edge device manager installs a privileged container in each respective edge device of the target group of edge devices. The privileged container monitors execution of a child task by an application container in a given edge device of the target group. Subsequently, a task sender of the edge device manager sends the plurality of child tasks comprising the pending task to the selected edge devices in the target group of edge devices for execution by the application containers and monitoring by the privileged containers. In addition, the task sender sends other child tasks comprising a set of other pending tasks to other edge devices in a normal group of edge devices in the edge computing architecture. It should be noted that the other edge devices in the normal group of edge devices do not currently have a privileged container installed to monitor execution of a child task by an application container.

Each respective edge device in the target group of edge devices runs its received child task and sends a result of running the received child task to a task result receiver of the edge device manager. In response to receiving a failed task result from an edge device in the target group, the task result receiver utilizes an incompatibility checker to add a privileged container incompatibility tag to a child task tag attribute corresponding to the child task that failed to execute on that edge device in the target group.

Afterward, the cluster definer defines a cluster of edge devices in the normal group of edge devices to run failed child tasks of the target group of edge devices. Then, the task sender sends the failed child tasks of the target group of edge devices to the cluster of edge devices in the normal group of edge devices. The cluster of edge devices in the normal group of edge devices runs the failed child tasks of the target group of edge devices and sends results of running the failed child tasks to the task result receiver.

In addition, the privileged container installer removes the privileged container from specific edge devices in the target group of edges devices that failed to properly execute given child tasks of a task template corresponding to the pending task. In other words, if results of the given child tasks running on specific edge devices in the target group of edge devices are fail, then the privileged container installer removes the privileged container from those specific edge devices in the target group and does not install that privileged container in certain edge devices of the normal group of edge devices that match the same task template corresponding to the specific edge devices of the target group where the privileged container was removed from those specific edge devices for failure to properly execute the given child tasks. In contrast, if the results of the given child tasks running on the specific edge devices in the target group of edge devices is pass, then the privileged container installer maintains the privileged container in those specific edge devices and installs that privileged container in certain edge devices of the normal group of edge devices that match the same task template corresponding to the specific edge devices of the target group where the privileged container was maintained on those specific edge devices for successfully executing the given child tasks.

Further, the privileged container installer also adds a privileged container installation tag to edge device tag attributes of those certain edge devices of the normal group of edge devices that had the privileged container installed. Moreover, the cluster definer selects particular edge devices to run child tasks of a pending task based on privileged container incompatibility tags assigned to child task tag attributes. In other words, if a privileged container is marked as incompatible for a particular child task in the child task tag attributes, then the cluster definer cannot select an edge device that has that privileged container currently installed to run that particular child task because of the incompatibility.

Thus, illustrative embodiments provide a selective, task-related privileged container augmentation process to prevent largescale application container task failures on edge devices, which is occurring in current indiscriminate privileged container augmentation solutions. This selective, task-related privileged container augmentation process of illustrative embodiments saves edge device computation resources, which increases performance of the edge computing architecture. Further, illustrative embodiments align privileged container installation on edge devices with edge device task assignments, which enables successful edge device privileged container augmentation, thereby accelerating privileged container augmentation with critical patches. In contrast, current privileged container augmentation solutions treat all edge device privileged containers identically and, therefore, must wait for all such edge device privileged containers to be able to perform the patching, which allows more edge device application containers to fail task execution while waiting for privileged container patching.

Thus, illustrative embodiments provide one or more technical solutions that overcome a technical problem with largescale application container task failures on edge devices caused by the indiscriminate privileged container augmentation of edge devices by current solutions. As a result, these one or more technical solutions provide a technical effect and practical application in the field of edge computing.

Figure 5:
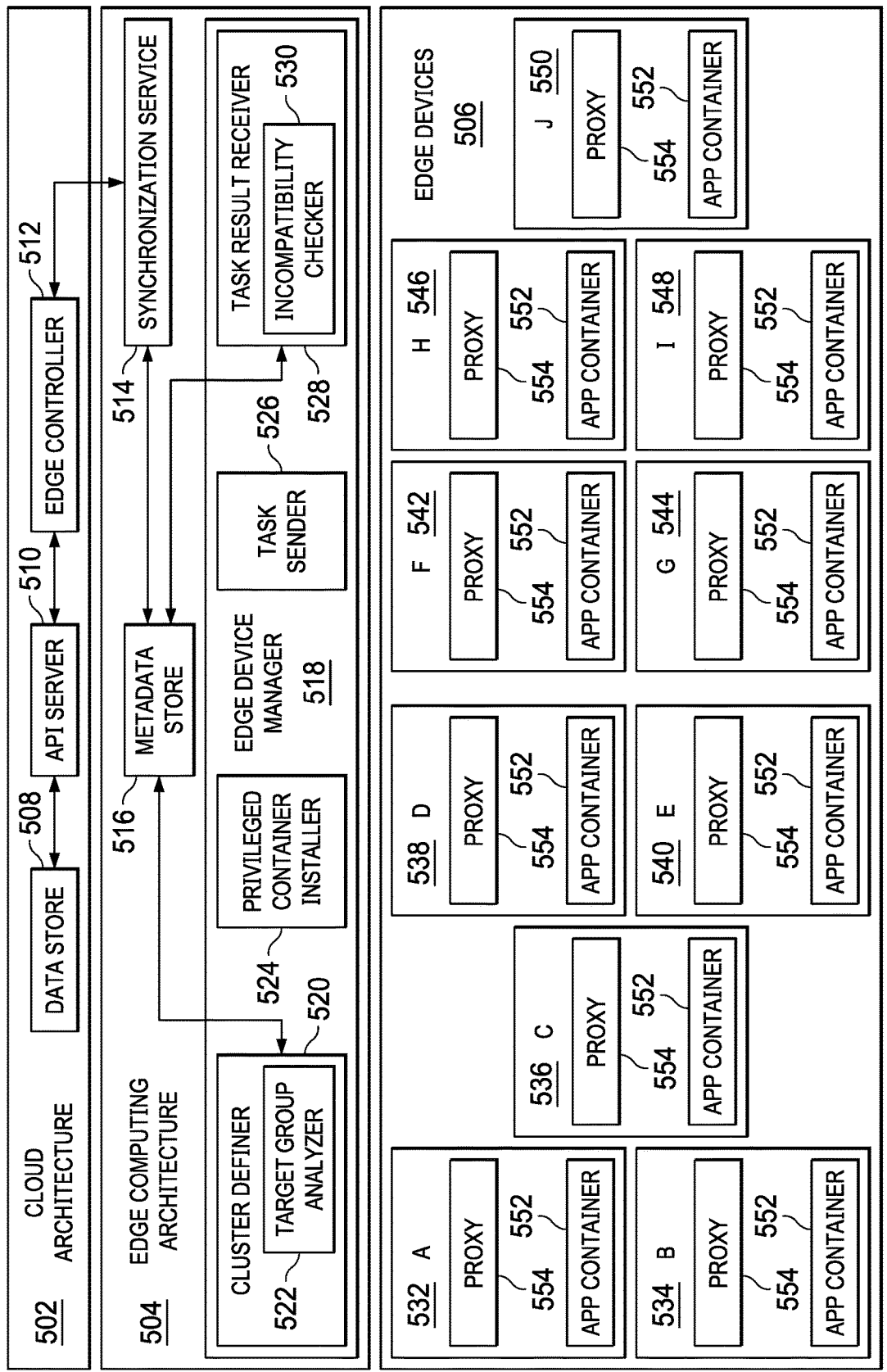
FIG. 5 is a diagram illustrating an example of an edge device management system in accordance with an illustrative embodiment.

With reference now to FIG. 5, a diagram illustrating an example of an edge device management system is depicted in accordance with an illustrative embodiment. Edge device management system 500 may be implemented in a network of data processing systems, such as network data processing system 100 in FIG. 1, or a cloud computing environment, such as cloud computing environment 300 in FIG. 3. Edge device management system 500 is a system of hardware and software components for selective privileged container augmentation of edge devices in an edge computing environment.

In this example, edge device management system 500 includes cloud architecture 502 and edge computing architecture 504. Cloud architecture 502 may be, for example, cloud computing environment 300 in FIG. 3. Edge computing architecture 504 is comprised of edge devices 506, such as, for example, edge computing devices 320A-320N in FIG. 3.

In this example, cloud architecture 502 includes data store 508, API server 510, and edge controller 512, which comprise a control plane of cloud architecture 502. Data store 508 contains configuration data of edge devices 506, representing the overall state of edge devices 506 at any given time. API server 510 provide both internal and external interfaces for cloud architecture 502 and generates services for applications. API server 510 updates state of objects in data store 508, thereby allowing configuration of application workloads across edge devices 506. Edge controller 512 is a reconciliation loop that drives actual edge device cluster state toward a desired edge device cluster state, communicating with API server 510 to manage available edge devices controlled by edge controller 512.

In this example, edge computing architecture 504 includes synchronization service 514, metadata store 516, and edge device manager 518. Edge computing architecture 504 utilizes synchronization service 514 to coordinate services between cloud architecture 502 and edge computing architecture 504. Edge computing architecture 504 utilizes metadata store 516 to store information regarding results (e.g., pass or fail) of executing child tasks on respective edge devices of edge devices 506 and any information regarding privileged container incompatibility with particular child tasks. Edge device manager 518 may be, for example, edge device manager 218 in FIG. 2. Edge computing architecture 504 utilizes edge device manager 518 to selectively augment certain edge devices of edge devices 506 with a privileged container that corresponds to a pending task. The selected edge devices augmented with the privileged container are to execute respective child tasks of the pending task.

In this example, edge device manager 518 is comprised of cluster definer 520, target group analyzer 522, privileged container installer 524, task sender 526, task result receiver 528, and incompatibility checker 530. Edge device manager 518 utilizes cluster definer 520 to determine clusters of edges devices within edge devices 506 to run tasks corresponding to application workloads. Cluster definer 520 utilizes target group analyzer 522 to select a group of certain edge devices within edge devices 506 to be a target group of edge devices to run child tasks comprising a particular pending task. Edge device manager 518 utilizes privileged container installer 524 to install a privileged container, which corresponds to that particular pending task, in each respective edge device of the target group of edge device that will run a given child task of that particular pending task. Edge device manager 518 utilizes task sender 526 to send child tasks to an appropriate edge device in edge devices 506. Edge device manager 518 utilizes task result receiver 528 to receive the task execution results from edge devices 506. Task results receiver 528 utilizes incompatibility checker 530 to determine whether a particular privileged container is incompatible with a particular task. For example, if a received task execution result is fail and the edge device failing to execute that task properly has a privileged container installed, then incompatibility checker 530 determines that the privileged container is incompatible with that task.

In this example, edge devices 506 is comprised of edge device A 532, edge device B 534, edge device C 536, edge device D 538, edge device E 540, edge device F 542, edge device G 544, edge device H 546, edge device I 548, and edge device J 550. However, it should be noted that edge devices 506 are meant as an example only and not as a limitation on illustrative embodiments. In other words, edge devices 506 may include any number of edge devices. In addition, edge devices 506 may include any type of edge devices, such as, for example, IoT devices. Further, each respective edge device of edge devices 506 includes application container 552 and proxy 554. Application container 552 includes everything needed to run an application workload, such as, for example, the code and any runtime the code requires, the application and system libraries, and any default values for any needed settings. Proxy 554 receives task execution data from application container 552. Proxy 554 can send the task execution data to an edge device running a dependent task or can send the task execution data to task result receiver 528.

Figure 6:
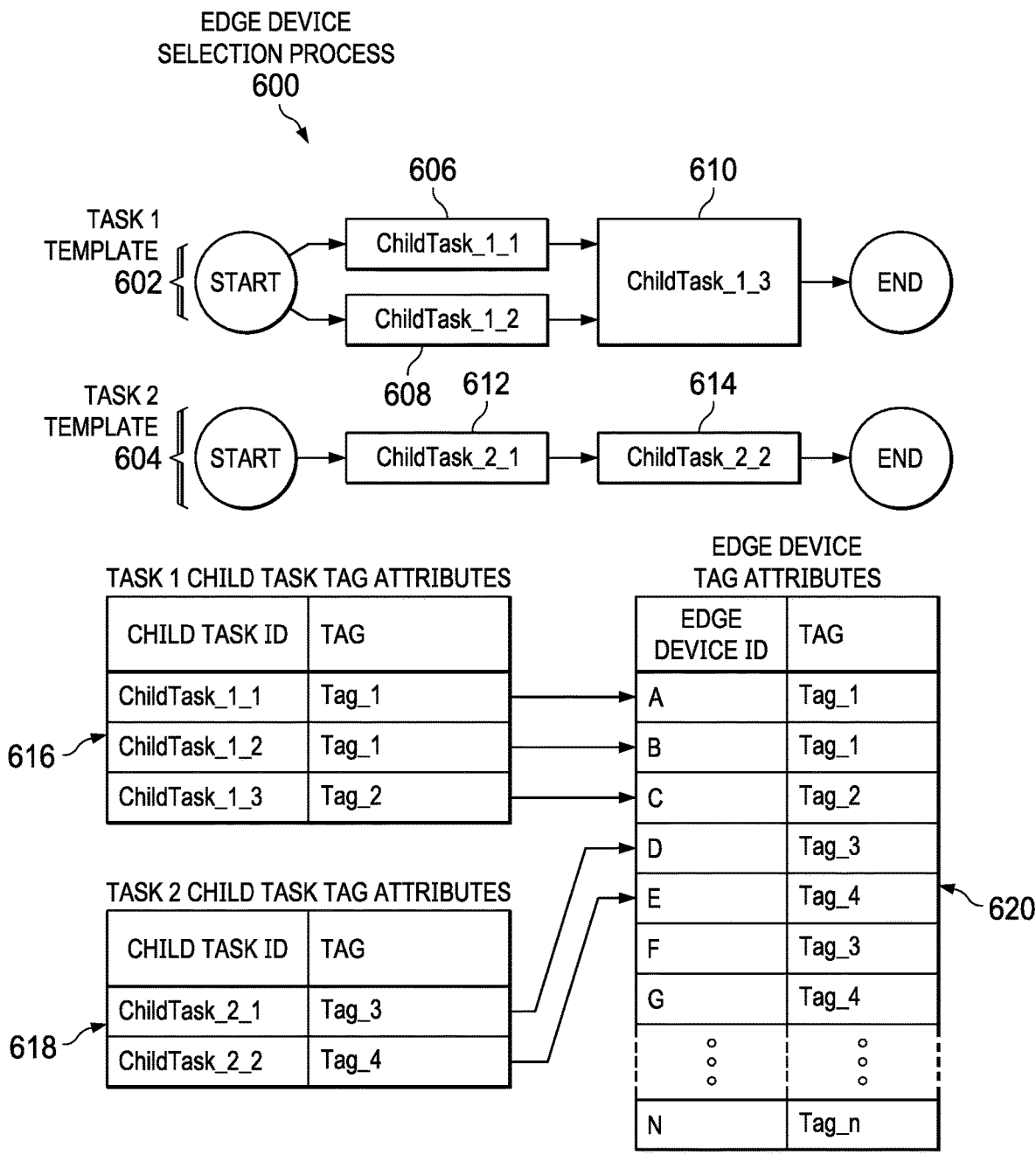
FIG. 6 is a diagram illustrating an example of an edge device selection process in accordance with an illustrative embodiment.

With reference now to FIG. 6, a diagram illustrating an example of an edge device selection process is depicted in accordance with an illustrative embodiment. Edge device selection process 600 may be implemented in an edge device manager of illustrative embodiments, such as, for example, edge device manager 518 in FIG. 5.

In this example, edge device selection process 600 includes task_1 template 602 and task_2 template 604. Task_1 template 602 and task_2 template 604 represent templates corresponding to two currently pending tasks. The edge device manager of illustrative embodiments receives task_1 template 602 and task_2 template 604. Upon receiving task_1 template 602 and task_2 template 604, the edge device manager analyzes task_1 template 602 and task_2 template 604 to identify their corresponding child tasks.

In this example, the pending task corresponding to task_1 template 602 is comprised of child task_1_1 606, child task_1_2 608, and child task_1_3 610. It should be noted that child task_1_3 610 is dependent on the output of child task_1_1 606 and child task_1_2 608. The pending task corresponding to task_2 template 604 is comprised of child task_2_1 612 and child task_2_2 614. It should be noted that child task_2_2 614 is dependent on the output of child task_2_1 612.

Further, the edge device manager identifies all available edge devices in an edge computing architecture, such as, for example, edge devices 506 in edge computing architecture 504. Furthermore, the edge device manager identifies task_1 child task tag attributes 616, task_2 child task tag attributes 618, and edge device tag attributes 620. Task_1 child task tag attributes 616 represent the tag attributes that correspond to child task_1_1 606, child task_1_2 608, and child task_1_3 610 comprising task_1. Task_2 child task tag attributes 618 represent the tag attributes that correspond to child task_2_1 612 and child task_2_2 614 comprising task_2. Edge device tag attributes 620 represent the tag attributes of all of the available edge devices, such as, for example, edge device A 532, edge device B 534, edge device C 536, edge device D 538, edge device E 540, edge device F 542, edge device G 544, edge device H 546, edge device I 548, and edge device J 550 in FIG. 5.

In this example, based on task_1 child task tag attributes 616, task_2 child task tag attributes 618, and edge device tag attributes 620, the edge device manager assigns child task_1_1 with a tag_1 attribute to edge device A with a tag_1 attribute; assigns child task_1_2 with a tag_1 attribute to edge device B with a tag_1 attribute; assigns child task_1_3 with a tag_2 attribute to edge device C with a tag_2 attribute; assigns child task_2_1 with a tag_3 attribute to edge device D with a tag_3 attribute; and assigns child task_2_2 with a tag_4 attribute to edge device E with a tag_4 attribute. In other words, the edge device manager matches tag attributes of child tasks to tag attributes of edge devices to select an appropriate edge device to run a particular child task.

With reference now to FIG. 7, a diagram illustrating an example of an edge device group assignment table is depicted in accordance with an illustrative embodiment. Edge device group assignment table 700 may be implemented in an edge device manager of illustrative embodiments, such as, for example, edge device manager 518 in FIG. 5.

In this example, edge device group assignment table 700 includes task instance identifier 702, task template identifier 704, cluster identifier 706, child task identifier 708, edge device identifier 710, and edge device group 712. Task instance identifier 702 identifies a particular task instance, task template identifier 704 identifies a particular task template corresponding a task instance, cluster identifier 706 identifies a particular cluster of edge devices corresponding to a task template, child task identifier 708 identifies the child tasks corresponding to a task template, edge device identifier 710 identifies a particular edge device that is assigned to run a particular child task, and edge device group 712 identifies whether a particular edge device is included in a target group of edge devices or a normal group of edge devices. It should be noted that the edge device manager will install a privileged container in edge devices included in the target group only.

In this example, the edge device manager assigns edge devices A, B, and C, which are to run child task_1_1, child task_1_2, and child task_1_3, respectively, of task instance_1_1, to a target group of edge devices. Similarly, the edge device manager assigns edge devices D and E, which are to run child task_2_1 and child task_2_2, respectively, of task instance_1_2, to the target group of edge devices. It should be noted that the edge device manager assigns edge devices F and G, which are to run child task_2_1 and child task_2_2, respectively, of task instance_1_3, to a normal group of edge devices without privileged containers installed. Also, it should be noted that the edge device manager assigns edge devices H, I, and J, which are to run child task_1_1, child task_1_2, and child task_1_3, respectively, of task instance_1_4, to the normal group of edge devices without privileged containers installed.

Figure 8A:
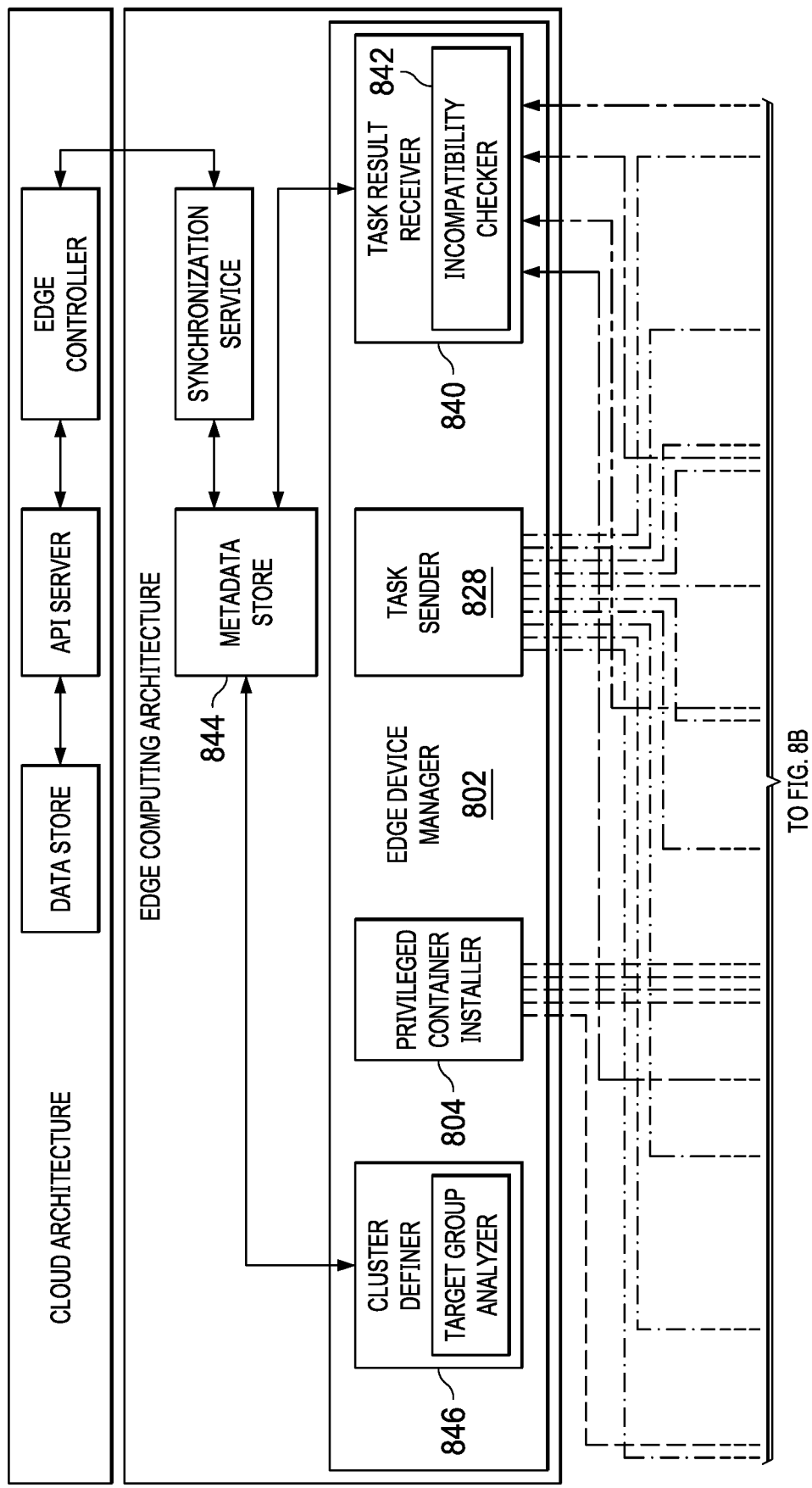
FIGS. 8A-8B are a diagram illustrating an example of a privileged container installation process in accordance with an illustrative embodiment.
Figure 8B:
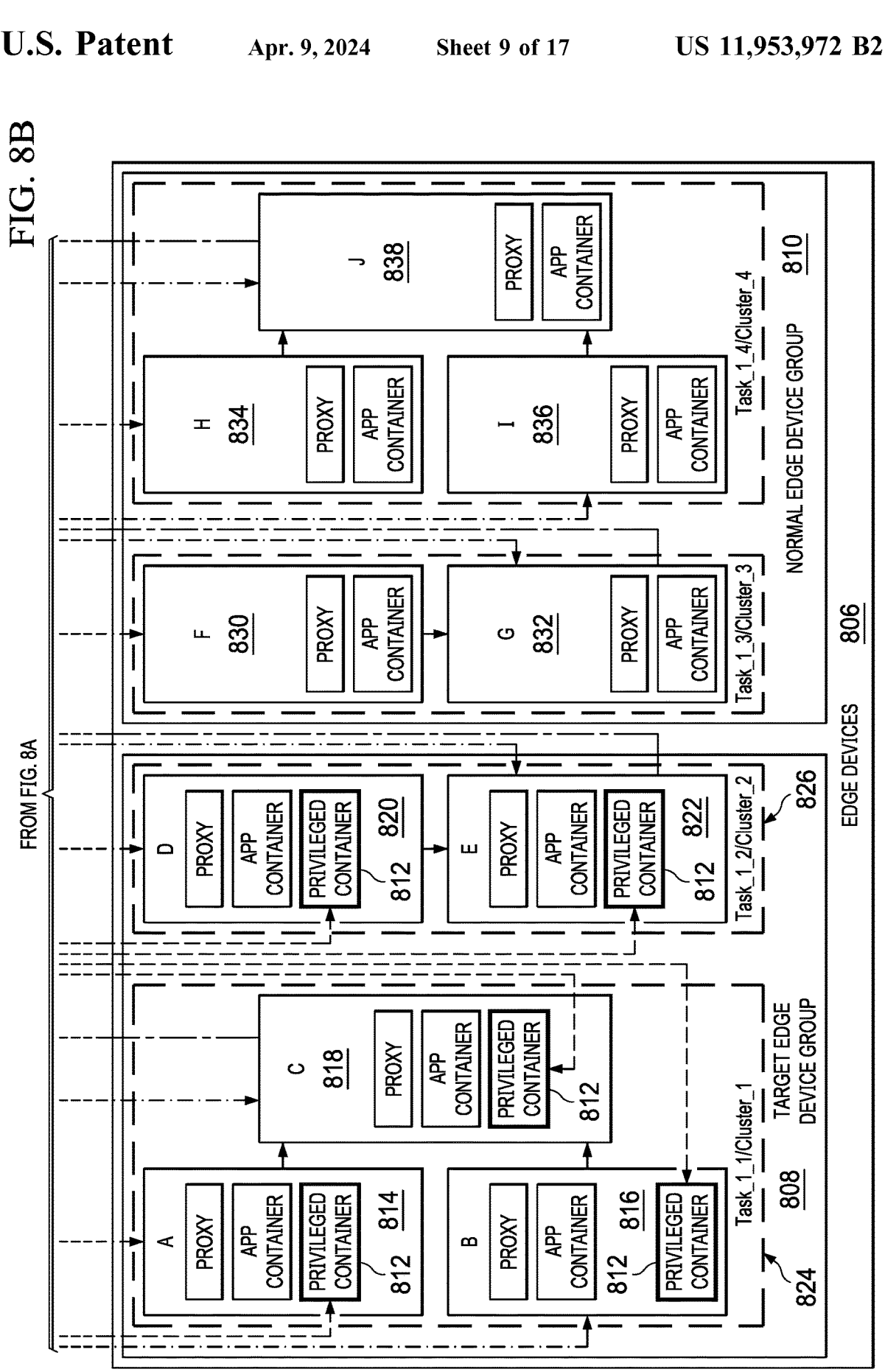

With reference now to FIGS. 8A-8B, a diagram illustrating an example of a privileged container installation process is depicted in accordance with an illustrative embodiment. Privileged container installation process 800 is implemented in edge device manager 802, such as, for example, edge device manager 518 in FIG. 5.

Edge device manager 802 utilizes privileged container installer 804 to install a privileged container corresponding to a pending task in certain edge devices of edge devices 806 within a target group of edge devices, such as target edge device group 808, based on information in an edge device group assignment table, such as, for example, edge device group assignment table 700 in FIG. 7. Remaining edge devices of edge devices 806 that are not included in target edge device group 808 and will not have a privileged container installed, are members of normal edge device group 810.

In this example, edge device manager 802 utilizes privileged container installer 804 to install privileged container 812 in edge device A 814, edge device B 816, edge device C 818, edge device D 820, and edge device E 822, which comprise target edge device group 808. It should be noted that privileged container 812 installed in edge device A 814, edge device B 816, and edge device C 818 may be a different type of privileged container installed in edge device D 820 and edge device E 822 based on the type of pending task that is to be run on each different edge device cluster (e.g., task_instance_1_1/cluster_1 824 or task_instance_1_2/cluster_2 826). Also, it should be noted that edge device C 818 is dependent on the output of edge device A 814 and edge device B 816 based on the corresponding task template, such as, for example, task_1 template 602 in FIG. 6. In addition, edge device E 822 is dependent on the output of edge device D 820 based on the corresponding task template, such as, for example, task_2 template 604 in FIG. 6.

In addition, edge device manager 802 utilizes task sender 828 to send selected child tasks to particular edge devices based on the information contained in the edge device group assignment table. In this example, task sender 828 sends child task_1_1, child task_1_2, and child task_1_3 of task_instance_1_1 to edge device A 814, edge device B 816, and edge device C 818, respectively, in target edge device group 808 for execution of assigned child tasks by an application container on each respective edge device and for monitoring of child task execution by privileged container 812 on each respective edge device. Task sender 828 also sends child task_2_1 and child task_2_2 of task_instance_1_2 to edge device D 820 and edge device E 822, respectively, in target edge device group 808 for execution of assigned child tasks by an application container on each respective edge device and for monitoring of child task execution by privileged container 812 on each respective edge device. Further, task sender 828 sends task_2_1 and child task_2_2 of task instance_1_3 to edge device F 830 and edge device G 832, respectively, in normal edge device group 810 for execution of assigned child tasks by an application container on each respective edge device. Furthermore, task sender 828 sends child task_1_1, child task_1_2, and child task_1_3 of task_instance_1_4 to edge device H 834, edge device I 836, and edge device J 838, respectively, in normal edge device group 810 for execution of assigned child tasks by an application container on each respective edge device.

Moreover, edge device manager 802 utilizes task result receiver 840 to receive child task execution results from edge device C 818, edge device E 822, edge device G 832, and edge device J 838 for task_instance_1_1, task_instance_1_2, task_instance_1_3, and task_instance_1_4, respectively. Task result receiver 840 utilizes incompatibility checker 842 to determine whether a child task execution result from either edge device C 818 or edge device E 822 was a fail. If one of the child task execution results was a fail, then incompatibility checker 842 determines that privileged container 812 is incompatible with that particular child task. For example, if incompatibility checker 842 determines that the execution result of child task_2_1 and child task_2_2 of task_instance_1_2 run on edge device D 820 and edge device E 822, respectively, was a fail, then incompatibility checker 842 determines that privileged container 812 installed on edge device D 820 and edge device E 822 is incompatible with child task_2_1 and child task_2_2.

Subsequently, task result receiver 840 sends the child task execution results, along with any determined privileged container incompatibilities, to metadata store 844. Cluster definer 846 utilizes the information contained in metadata store 844 to determine future task to edge device assignments.

With reference now to FIG. 9, a diagram illustrating an example of a child task result table is depicted in accordance with an illustrative embodiment. Child task result table 900 may be implemented in a task result receiver of an edge device manager, such as, for example, task result receiver 840 of edge device manager 802 in FIG. 8A. In addition, child task result table 900 may be stored in a metadata store, such as, for example, metadata store 844 in FIG. 8A.

In this example, child task result table 900 includes task instance identifier 902, task instance result 904, task template identifier 906, cluster identifier 908, child task identifier 910, edge device identifier 912, child task result 914, and edge device group 916. Child task result table 900 indicates in this example that child task_1_1, child task_1_2, and child task_1_3 of task_instance_1_1 run on edge device A, edge device B, and edge device C, respectively, such as, for example, edge device A 814, edge device B 816, and edge device C 818 in FIG. 8B, was a pass. Child task result table 900 also indicates in this example that child task_2_1 and child task_2_2 of task_instance_1_2 run on edge device D and edge device E, respectively, such as, for example, edge device D 820 and edge device E 822 in FIG. 8B, was a fail. Further, task_2_1 and child task_2_2 of task instance_1_3 run on edge device F and edge device G, respectively, such as, for example, edge device F 830 and edge device G 832 in FIG. 8B, was a pass. Furthermore, child task_1_1, child task_1_2, and child task_1_3 of task_instance_1_4 run on edge device H, edge device I, and edge device J, respectively, such as, for example, on edge device H 834, edge device I 836, and edge device J 838 in FIG. 8B, was a pass also.

Figure 10:
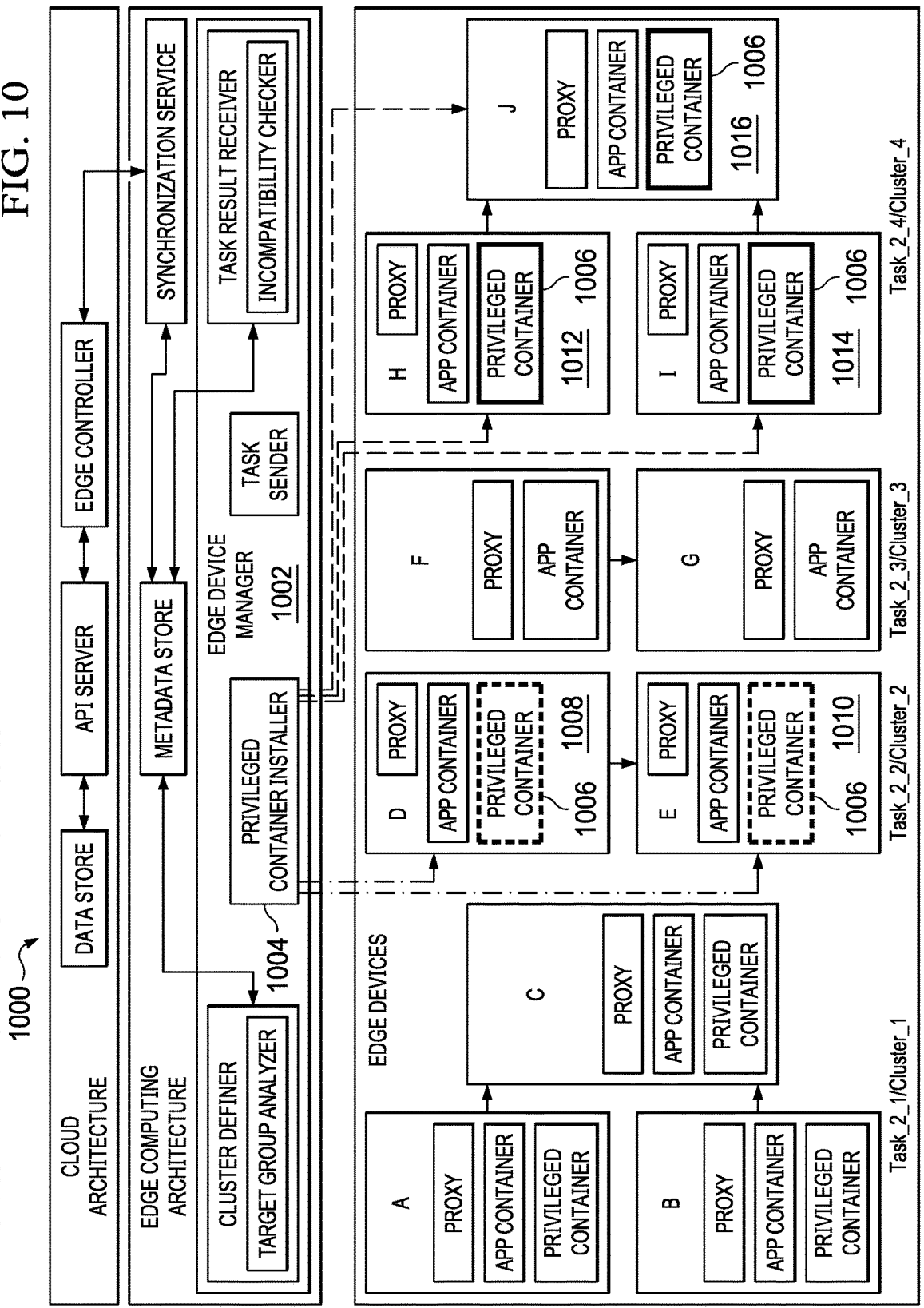
FIG. 10 is a diagram illustrating an example of a privileged container removal and installation process in accordance with an illustrative embodiment.

With reference now to FIG. 10, a diagram illustrating an example of a privileged container removal and installation process is depicted in accordance with an illustrative embodiment. Privileged container removal and installation process 1000 is implemented in edge device manager 1002, such as, for example, edge device manager 802 in FIG. 8A. Edge device manager 1002 performs privileged container removal and installation process 1000 based on information in a child task result table, such as, for example, child task result table 900 in FIG. 9.

In this example, edge device manager 1002 utilizes privileged container installer 1004 to remove privileged container 1006 from edge device D 1008 and edge device E 1010 based on the execution result of child task_2_1 and child task_2_2 of task_instance_1_2 run on edge device D 1008 and edge device E 1010, respectively, being a fail. In addition, privileged container installer 1004 installs privileged container 1006 on edge device H 1012, edge device I 1014, and edge device J 1016 based on the successful execution of child task_1_1, child task_1_2, and child task_1_3 of task_instance_1_4.

Figure 11:
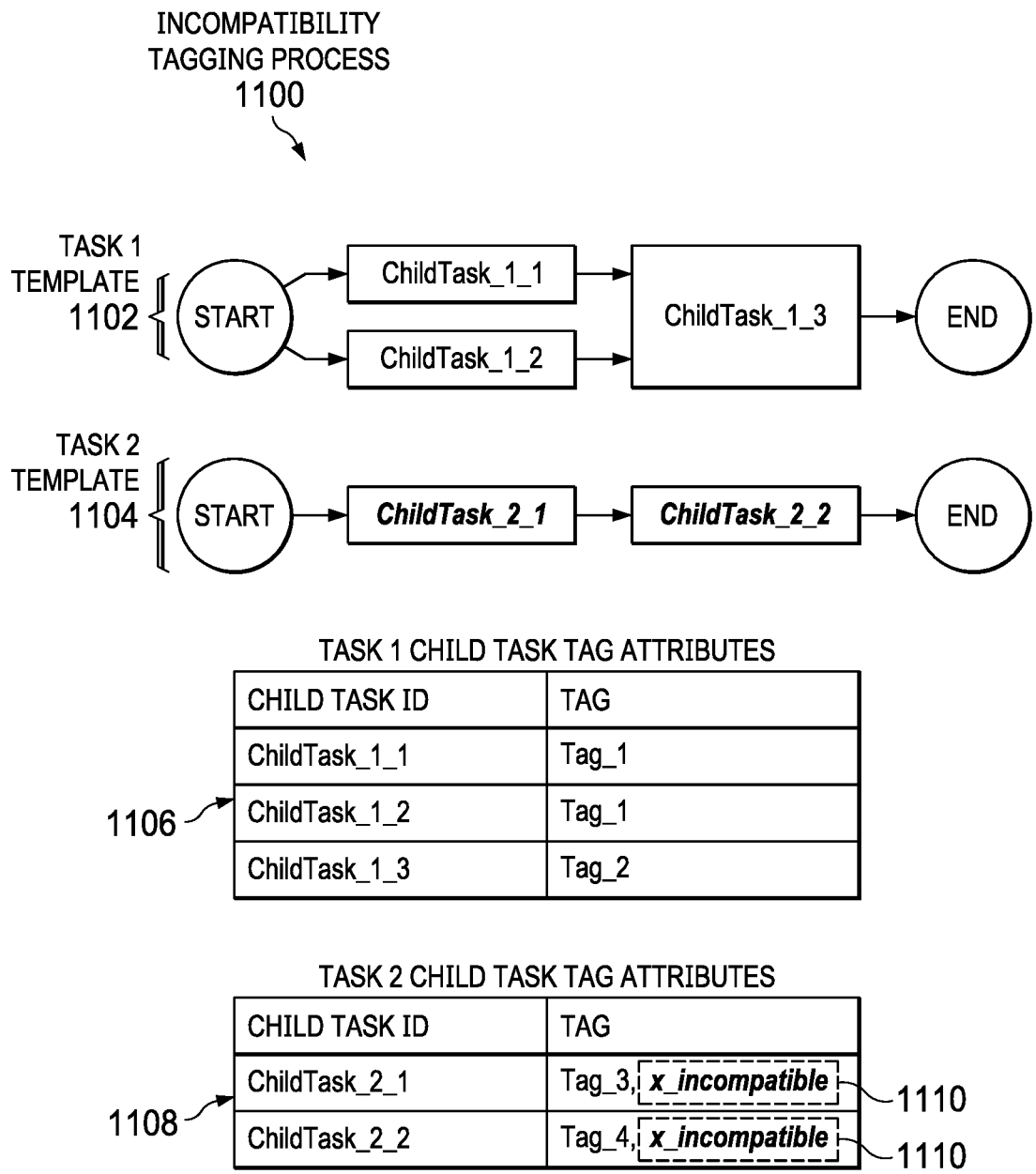
FIG. 11 is a diagram illustrating an example of an incompatibility tagging process in accordance with an illustrative embodiment.

With reference now to FIG. 11, a diagram illustrating an example of an incompatibility tagging process is depicted in accordance with an illustrative embodiment. Incompatibility tagging process 1100 may be implemented in an incompatibility checker of an edge device manager, such as, for example, incompatibility checker 842 of edge device manager 802 in FIG. 8A.

In this example, incompatibility tagging process 1100 includes task_1 template 1102, task_2 template 1104, task_1 child task tag attributes 1106, and task_2 child task tag attributes 1108. Task_1 template 1102, task_2 template 1104, task_1 child task tag attributes 1106, and task_2 child task tag attributes 1108 may be, for example, task_1 template 602, task_2 template 604, task_1 child task tag attributes 616, and task_2 child task tag attributes 618 in FIG. 6.

Based on the information contained in a child task result table, such as, for example, child task result table 900 in FIG. 9, the incompatibility checker adds privileged container incompatibility tag 1110 to the tag attributes of child task_2_1 and child task_2_2 of task_instance_1_2 in response to edge device D and edge device E of the target edge device group failing to execute child task_2_1 and child task_2_2 of task_instance_1_2. It should be noted that the "x" in privileged container incompatibility tag 1110 represents an identifier of the particular privileged container that is incompatible with that particular child task.

With reference now to FIG. 12, a diagram illustrating an example of a privileged container installer action table is depicted in accordance with an illustrative embodiment. Privileged container installer action table 1200 may be implemented in a privileged container installer of an edge device manager, such as, for example, privileged container installer 1004 of edge device manager 1002 in FIG. 10.

In this example, privileged container installer action table 1200 includes task instance identifier 1202, task instance result 1204, task template identifier 1206, cluster identifier 1208, child task identifier 1210, edge device identifier 1212, child task result 1214, privileged container installer action 1216, and edge device group 1218. The information contained in privileged container installer action table 1200 may be based on a privileged container removal and installation process, such as, for example, privileged container removal and installation process 1000 in FIG. 10.

In this example, the privileged container installer performs privileged container installer action 1216 by removing the privileged container from edge device D and edge device E in the target edge device group for failing to execute child task_2_1 and child task_2_2 of task_instance_1_2. In addition, the privileged container installer adds the privileged container to edge device H, edge device I, and edge device J based on the successful execution of child task_1_1, child task_1_2, and child task_1_3 of task_instance_1_4.

It should be noted that when the results of given child tasks (e.g., child task_1_1, child task_1_2, and child task_1_3 of task_instance_1_1) running on the specific edge devices in the target group of edge devices (e.g., edge devices A, B, an C) is pass, then the privileged container installer maintains the privileged container in those specific edge devices (e.g., no action is taken by the privileged container installer). Also, the privileged container installer installs that same privileged container in certain edge devices of the normal group of edge devices (e.g., edge devices H, I, and J) that match the same task template (e.g., task_1 template) corresponding to the specific edge devices of the target group where that same privileged container was maintained on those specific edge devices for successfully executing the same child tasks, but in a different task_instance.

Further, when the results of given child tasks (e.g., child task_2_1 and child task_2_2 of task_instance_1_2) running on specific edge devices in the target group of edge devices (e.g., edge devices D and E) are fail, then the privileged container installer removes the privileged container from those specific edge devices in the target group and does not install that privileged container in certain edge devices of the normal group of edge devices (e.g., edge devices F and G) that match the same task template (e.g., task_2 template) corresponding to the specific edge devices of the target group where the privileged container was removed from those specific edge devices for failure to properly execute those same child tasks, but in a different task_instance.

Figure 13:
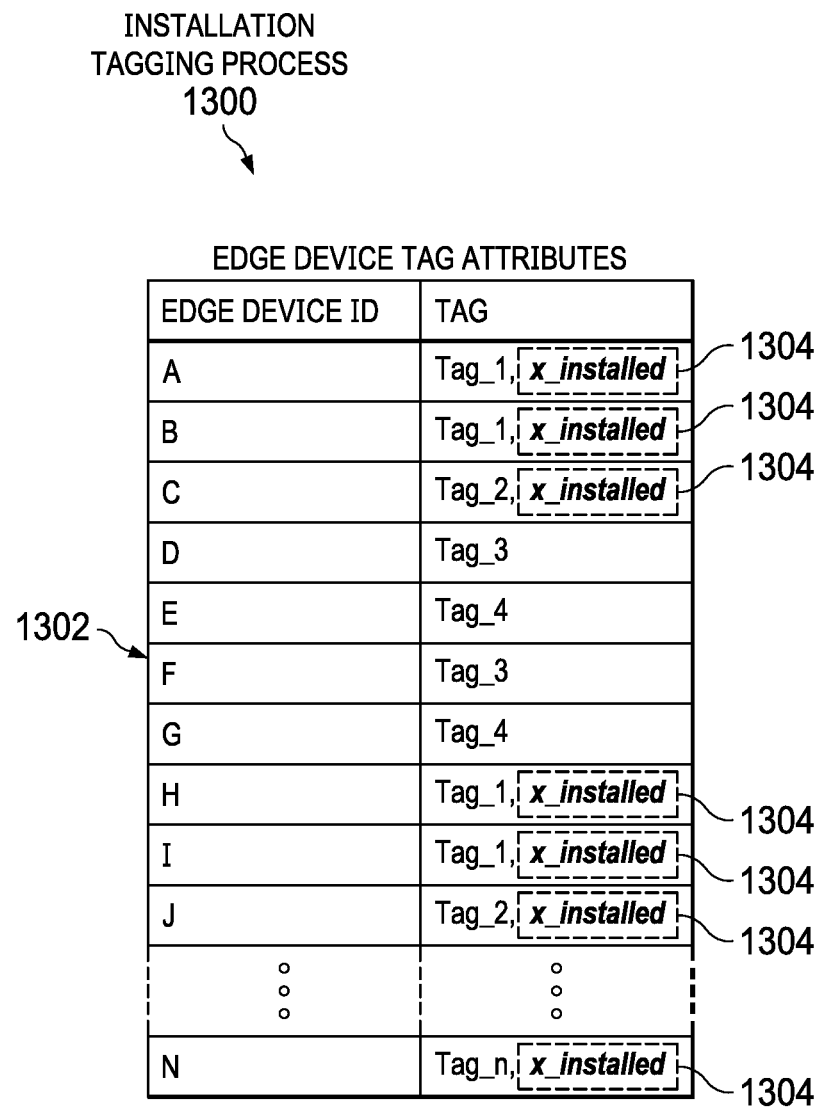
FIG. 13 is a diagram illustrating an example of an installation tagging process in accordance with an illustrative embodiment.

With reference now to FIG. 13, a diagram illustrating an example of an installation tagging process is depicted in accordance with an illustrative embodiment. Installation tagging process 1300 may be implemented in a privileged container installer of an edge device manager, such as, for example, privileged container installer 1004 of edge device manager 1002 in FIG. 10. In addition, installation tagging process 1300 may be based on a privileged container removal and installation process, such as, for example, privileged container removal and installation process 1000 in FIG. 10.

In this example, installation tagging process 1300 includes edge device tag attributes 1302, such as, for example, edge device tag attributes 620 in FIG. 6. Based on the example of FIG. 10, the privileged container installer removes the privileged container installation tag from edge devices D and E because the privileged container was removed from those edge devices for failure to properly execute assigned child tasks. In addition, the privileged container installer adds privileged container installation tag 1304 to edge devices H, I, and J. It should be noted that the "x" in privileged container installation tag 1304 represents an identifier of the particular privileged container that is installed on a particular edge device. Also, it should be noted that privileged container installation tag 1304 was already added to edge devices A, B, and C because the privileged container was previously installed on those edge devices and a privileged container installation tag is not shown for edge devices F and G because a privileged container is not currently installed on those edge devices.

Figure 14:
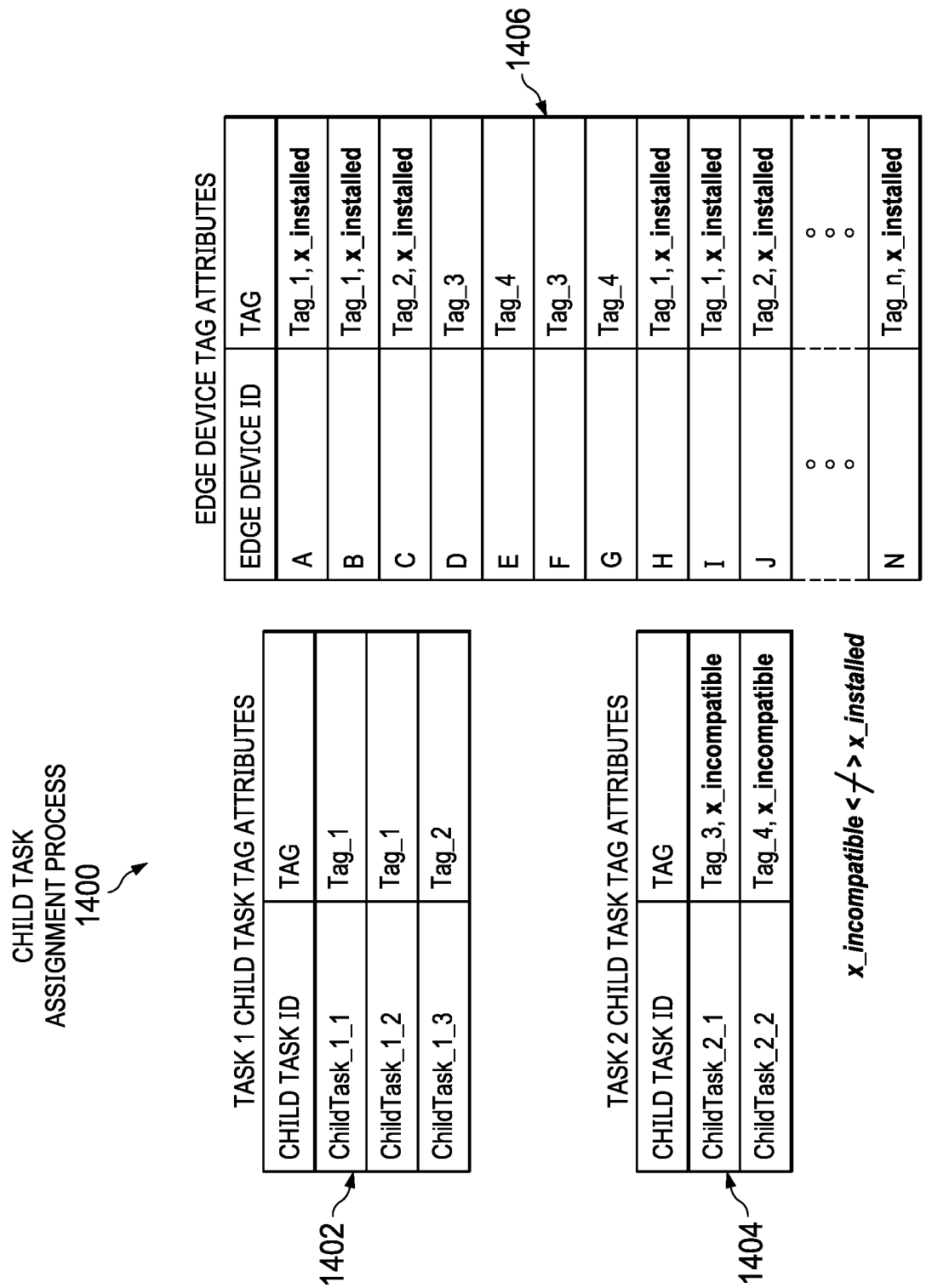
FIG. 14 is a diagram illustrating an example of a child task assignment process in accordance with an illustrative embodiment.

With reference now to FIG. 14, a diagram illustrating an example of a child task assignment process is depicted in accordance with an illustrative embodiment. Child task assignment process 1400 may be implemented in a target group analyzer of an edge device manager, such as, for example, target group analyzer 522 of edge device manager 518 in FIG. 5.

In this example, child task assignment process 1400 includes task_1 child task tag attributes 1402, task_2 child task tag attributes 1404, and edge device tag attributes 1406. Task_1 child task tag attributes 1402 and task_2 child task tag attributes 1404 may be, for example, task_1 child task tag attributes 1106 and task_2 child task tag attributes 1108 in FIG. 11. Edge device tag attributes 1406 may be, for example, edge device tag attributes 1302 in FIG. 13.

The target group analyzer will not assign a child task having an incompatibility tag attribute for a particular privileged container to an edge device that has that particular privileged container currently installed, which is indicated by a privileged container installation tag attribute added to a particular edge device. Because edge devices D, E, F, and G do not have a privileged container installed, which is indicated by the lack of a corresponding privileged container installation tag attribute, the target group analyzer can select edge device D, which has a tag_3 attribute, to run child task_2_1, which also has a tag_3 attribute, and select edge device E, which has a tag_4 attribute, to run child task_2_2, which also has a tag_4 attribute. Edge devices D and E may be running, for example, task_instance_2_2 comprised of child task_2_1 and child task_2_2. Similarly, the target group analyzer can select edge device F, which has a tag_3 attribute, to run child task_2_1, which also has a tag_3 attribute, and select edge device G, which has a tag_4 attribute, to run child task_2_2, which also has a tag_4 attribute. Edge devices F and G may be running, for example, task_instance_2_3 comprised of child task_2_1 and child task_2_2.

Figure 15A:
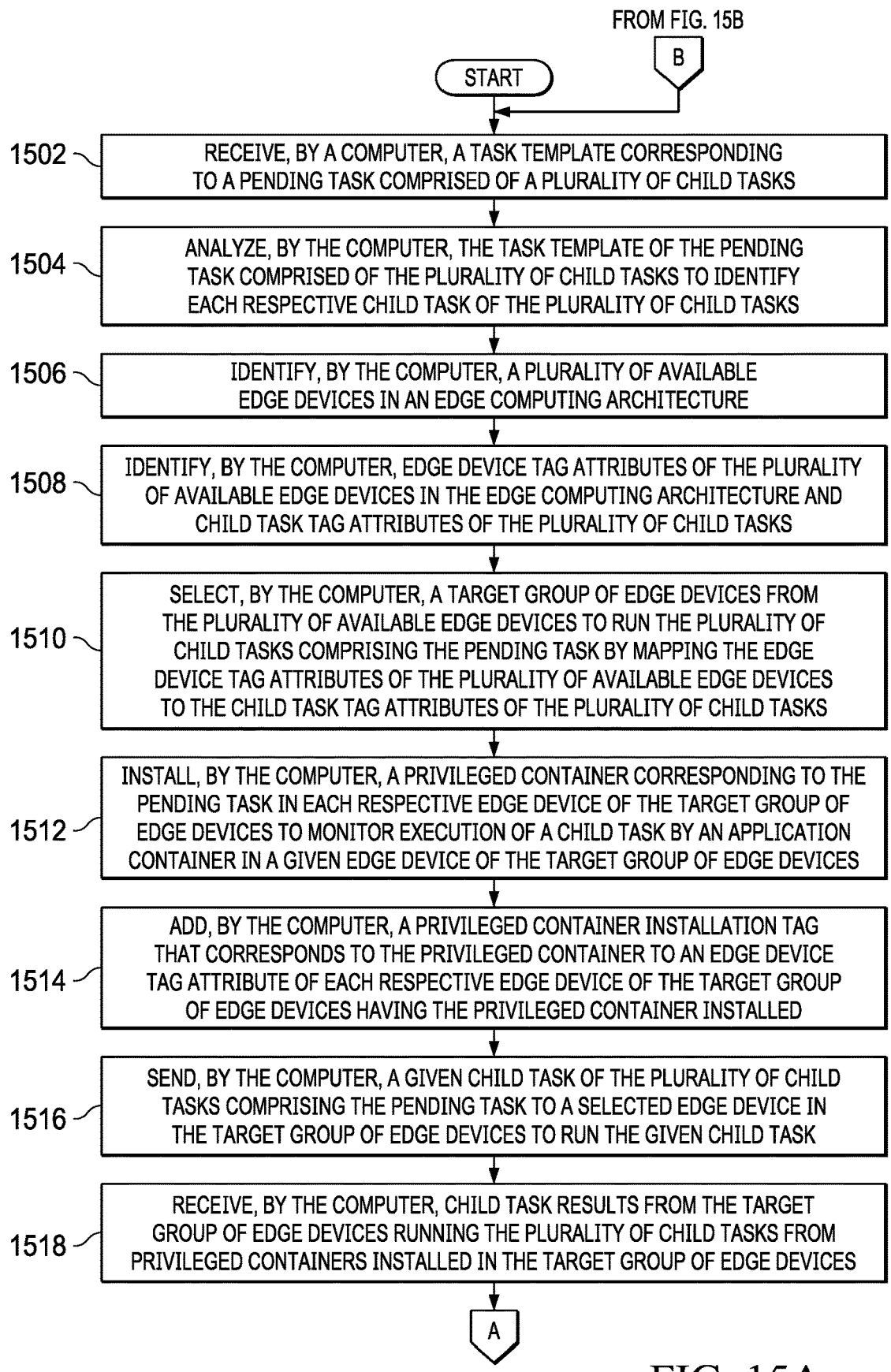
FIGS. 15A-15B are a flowchart illustrating a process for selective privileged container augmentation in accordance with an illustrative embodiment.
Figure 15B:
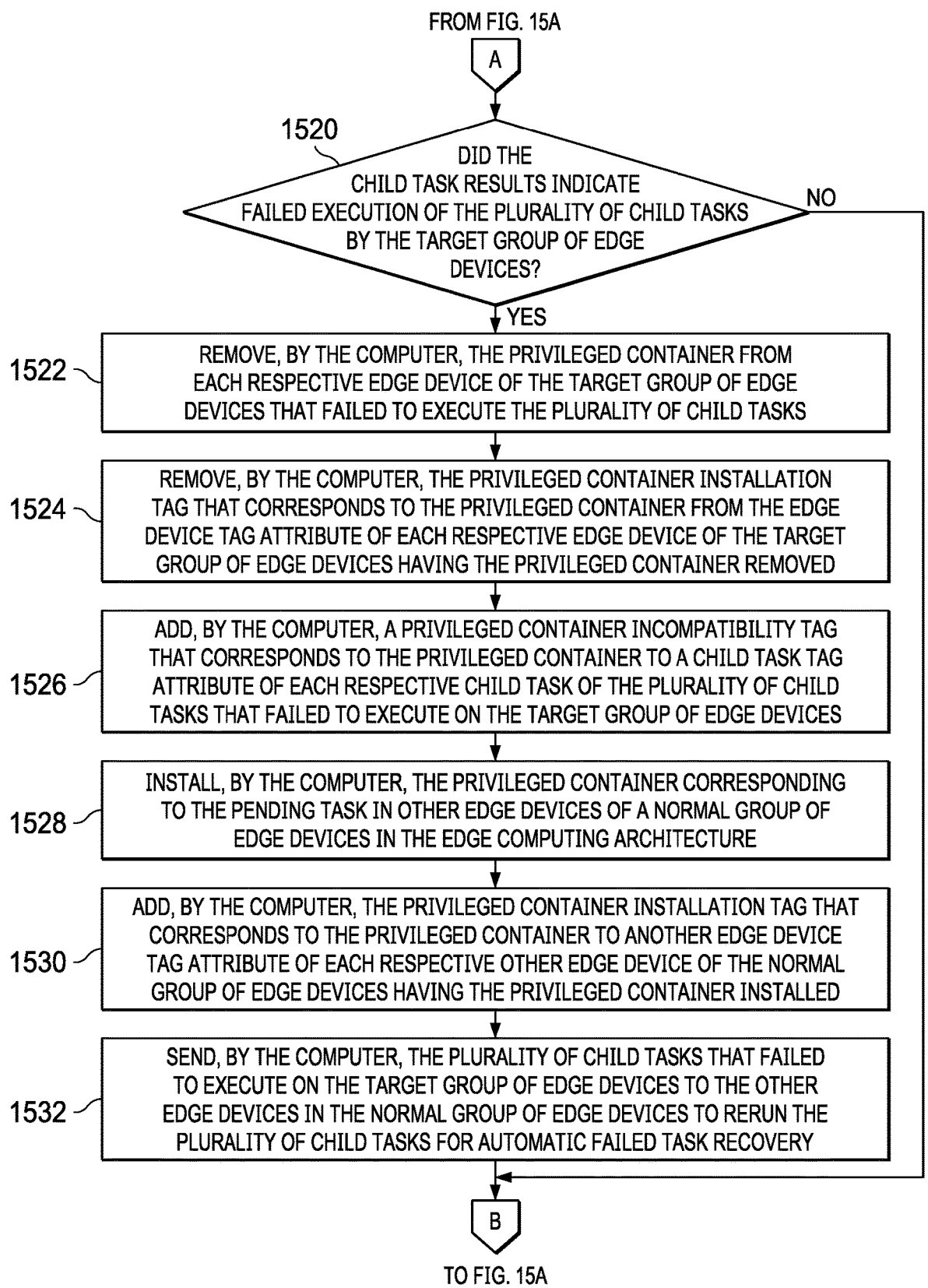

With reference now to FIGS. 15A-15B, a flowchart illustrating a process for selective privileged container augmentation is shown in accordance with an illustrative embodiment. The process shown in FIGS. 15A-15B may be implemented in a computer, such as, for example, server 104 in FIG. 1 or data processing system 200 in FIG. 2. For example, the process shown in FIGS. 15A-15B may be implemented in edge device manager 218 in FIG. 2.

The process begins when the computer receives a task template corresponding to a pending task comprised of a plurality of child tasks (step 1502). The computer analyzes the task template of the pending task comprised of the plurality of child tasks to identify each respective child task of the plurality of child tasks (step 1504). The computer also identifies a plurality of available edge devices in an edge computing architecture (step 1506).

In addition, the computer identifies edge device tag attributes of the plurality of available edge devices in the edge computing architecture and child task tag attributes of the plurality of child tasks comprising the pending task (step 1508). The computer selects a target group of edge devices from the plurality of available edge devices to run the plurality of child tasks comprising the pending task by mapping the edge device tag attributes of the plurality of available edge devices to the child task tag attributes of the plurality of child tasks (step 1510).

The computer installs a privileged container corresponding to the pending task in each respective edge device of the target group of edge devices to monitor execution of a child task by an application container in a given edge device of the target group of edge devices (step 1512). Further, the computer adds a privileged container installation tag that corresponds to the privileged container to an edge device tag attribute of each respective edge device of the target group of edge devices having the privileged container installed (step 1514). Furthermore, the computer sends a given child task of the plurality of child tasks comprising the pending task to a selected edge device in the target group of edge devices to run the given child task (step 1516).

Subsequently, the computer receives child task results from the target group of edge devices running the plurality of child tasks from privileged containers installed in the target group of edge devices (step 1518). The computer makes a determination as to whether the child task results indicated failed execution of the plurality of child tasks by the target group of edge devices (step 1520). If the computer determines that the child task results did not indicate failed execution of the plurality of child tasks by the target group of edge devices, NO output of step 1520, then the process returns to step 1502 where the computer waits to receive another task template corresponding to another pending task.

If the computer determines that the child task results did indicate failed execution of the plurality of child tasks by the target group of edge devices, YES output of step 1520, then the computer removes the privileged container from each respective edge device of the target group of edge devices that failed to execute the plurality of child tasks (step 1522). The computer also removes the privileged container installation tag that corresponds to the privileged container from the edge device tag attribute that corresponds to each respective edge device of the target group of edge devices having the privileged container removed (step 1524). In addition, the computer adds a privileged container incompatibility tag that corresponds to the privileged container to a child task tag attribute of each respective child task of the plurality of child tasks that failed to execute on the target group of edge devices (step 1526).

Moreover, the computer installs the privileged container corresponding to the pending task in other edge devices of a normal group of edge devices in the edge computing architecture (step 1528). Further, the computer adds the privileged container installation tag that corresponds to the privileged container to another edge device tag attribute of each respective other edge device of the normal group of edge devices having the privileged container installed (step 1530). Furthermore, the computer sends the plurality of child tasks that failed to execute on the target group of edge devices to the other edge devices in the normal group of edge devices to rerun the plurality of child tasks for automatic failed task recovery (step 1532). Thereafter, the process returns to step 1502 where the computer waits to receive another task template corresponding to another pending task.

Thus, illustrative embodiments of the present invention provide a computer-implemented method, computer system, and computer program product for selective privileged container augmentation of edge devices in an edge computing architecture. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selective privileged container augmentation, the computer-implemented method comprising:
    selecting, by a computer, a target group of edge devices from a plurality of available edge devices to run a plurality of child tasks comprising a pending task by mapping edge device tag attributes of the plurality of available edge devices to child task tag attributes of the plurality of child tasks;
    installing, by the computer, a privileged container corresponding to the pending task in each respective edge device of the target group of edge devices to monitor execution of a child task by an application container in a given edge device of the target group of edge devices;
    adding, by the computer, a privileged container installation tag that corresponds to the privileged container to an edge device tag attribute of each respective edge device of the target group of edge devices having the privileged container installed; and
    sending, by the computer, a given child task of the plurality of child tasks comprising the pending task to a selected edge device in the target group of edge devices to run the given child task.

2. The computer-implemented method of claim 1 further comprising:
    receiving, by the computer, child task results from the target group of edge devices running the plurality of child tasks from privileged containers installed in the target group of edge devices; and
    determining, by the computer, whether the child task results indicated failed execution of the plurality of child tasks by the target group of edge devices.

3. The computer-implemented method of claim 2 further comprising:
    responsive to the computer determining that the child task results did indicate failed execution of the plurality of child tasks by the target group of edge devices, removing, by the computer, the privileged container from each respective edge device of the target group of edge devices that failed to execute the plurality of child tasks; and
    removing, by the computer, the privileged container installation tag that corresponds to the privileged container from the edge device tag attribute of each respective edge device of the target group of edge devices having the privileged container removed.

4. The computer-implemented method of claim 3 further comprising:
    adding, by the computer, a privileged container incompatibility tag that corresponds to the privileged container to a child task tag attribute of each respective child task of the plurality of child tasks that failed to execute on the target group of edge devices.

5. The computer-implemented method of claim 4 further comprising:
    installing, by the computer, the privileged container corresponding to the pending task in other edge devices of a normal group of edge devices; and
    adding, by the computer, the privileged container installation tag that corresponds to the privileged container to another edge device tag attribute of each respective other edge device of the normal group of edge devices having the privileged container installed.

6. The computer-implemented method of claim 5 further comprising:
    sending, by the computer, the plurality of child tasks that failed to execute on the target group of edge devices to the other edge devices in the normal group of edge devices to rerun the plurality of child tasks for automatic failed task recovery.

7. The computer-implemented method of claim 1 further comprising:
    receiving, by the computer, a task template corresponding to the pending task comprised of the plurality of child tasks;
    analyzing, by the computer, the task template of the pending task comprised of the plurality of child tasks to identify each respective child task of the plurality of child tasks;
    identifying, by the computer, the plurality of available edge devices in an edge computing architecture; and
    identifying, by the computer, the edge device tag attributes of the plurality of available edge devices in the edge computing architecture and the child task tag attributes of the plurality of child tasks comprising the pending task.

8. The computer-implemented method of claim 1, wherein the computer does not assign a particular child task that includes a privileged container incompatibility tag corresponding to a particular privileged container to a particular edge device that currently has that particular privileged container installed because of incompatibility.

9. The computer-implemented method of claim 1, wherein the computer, in response to results of given child tasks running on specific edge devices in a target edge device group are fail, removes the privileged container from the specific edge devices in the target edge device group and does not install the privileged container in certain edge devices of a normal group of edge devices that match a same task template corresponding to the specific edge devices of the target edge device group where the privileged container was removed from the specific edge devices for failure to execute the given child tasks.

10. The computer-implemented method of claim 1, wherein the computer, in response to results of given child tasks running on specific edge devices in a target edge device group is pass, maintains the privileged container in the specific edge devices and installs the privileged container in certain edge devices of a normal group of edge devices that match a same task template corresponding to the specific edge devices of the target edge device group where the privileged container was maintained on the specific edge devices for successfully executing the given child tasks.

11. A computer system for selective privileged container augmentation, the computer system comprising:
a bus system;
a storage device connected to the bus system, wherein the storage device stores program instructions; and
a processor connected to the bus system, wherein the processor executes the program instructions to:
select a target group of edge devices from a plurality of available edge devices to run a plurality of child tasks comprising a pending task by mapping edge device tag attributes of the plurality of available edge devices to child task tag attributes of the plurality of child tasks;
install a privileged container corresponding to the pending task in each respective edge device of the target group of edge devices to monitor execution of a child task by an application container in a given edge device of the target group of edge devices;
add a privileged container installation tag that corresponds to the privileged container to an edge device tag attribute of each respective edge device of the target group of edge devices having the privileged container installed; and
send a given child task of the plurality of child tasks comprising the pending task to a selected edge device in the target group of edge devices to run the given child task.

12. The computer system of claim 11, wherein the processor further executes the program instructions to:
receive child task results from the target group of edge devices running the plurality of child tasks from privileged containers installed in the target group of edge devices; and
determine whether the child task results indicated failed execution of the plurality of child tasks by the target group of edge devices.

13. The computer system of claim 12, wherein the processor further executes the program instructions to:
remove the privileged container from each respective edge device of the target group of edge devices that failed to execute the plurality of child tasks in responsive determining that the child task results did indicate failed execution of the plurality of child tasks by the target group of edge devices; and
remove the privileged container installation tag that corresponds to the privileged container from the edge device tag attribute of each respective edge device of the target group of edge devices having the privileged container removed.

14. A computer program product for selective privileged container augmentation, the computer program product comprising a computer-readable storage medium having program instructions embodied therewith, the program instructions executable by a computer to cause the computer to perform a method of:
selecting, by the computer, a target group of edge devices from a plurality of available edge devices to run a plurality of child tasks comprising a pending task by mapping edge device tag attributes of the plurality of available edge devices to child task tag attributes of the plurality of child tasks;
installing, by the computer, a privileged container corresponding to the pending task in each respective edge device of the target group of edge devices to monitor execution of a child task by an application container in a given edge device of the target group of edge devices;
adding, by the computer, a privileged container installation tag that corresponds to the privileged container to an edge device tag attribute of each respective edge device of the target group of edge devices having the privileged container installed; and
sending, by the computer, a given child task of the plurality of child tasks comprising the pending task to a selected edge device in the target group of edge devices to run the given child task.

15. The computer program product of claim 14 further comprising:
receiving, by the computer, child task results from the target group of edge devices running the plurality of child tasks from privileged containers installed in the target group of edge devices; and
determining, by the computer, whether the child task results indicated failed execution of the plurality of child tasks by the target group of edge devices.

16. The computer program product of claim 15 further comprising:
responsive to the computer determining that the child task results did indicate failed execution of the plurality of child tasks by the target group of edge devices, removing, by the computer, the privileged container from each respective edge device of the target group of edge devices that failed to execute the plurality of child tasks; and
removing, by the computer, the privileged container installation tag that corresponds to the privileged container from the edge device tag attribute of each respective edge device of the target group of edge devices having the privileged container removed.

17. The computer program product of claim 16 further comprising:
adding, by the computer, a privileged container incompatibility tag that corresponds to the privileged container to a child task tag attribute of each respective child task of the plurality of child tasks that failed to execute on the target group of edge devices.

18. The computer program product of claim 17 further comprising:

installing, by the computer, the privileged container corresponding to the pending task in other edge devices of a normal group of edge devices; and adding, by the computer, the privileged container installation tag that corresponds to the privileged container to another edge device tag attribute of each respective other edge device of the normal group of edge devices having the privileged container installed.

19. The computer program product of claim 18 further comprising:

sending, by the computer, the plurality of child tasks that failed to execute on the target group of edge devices to the other edge devices in the normal group of edge devices to rerun the plurality of child tasks for automatic failed task recovery.

20. The computer program product of claim 14 further comprising:

receiving, by the computer, a task template corresponding to the pending task comprised of the plurality of child tasks;

analyzing, by the computer, the task template of the pending task comprised of the plurality of child tasks to identify each respective child task of the plurality of child tasks;

identifying, by the computer, the plurality of available edge devices in an edge computing architecture; and identifying, by the computer, the edge device tag attributes of the plurality of available edge devices in the edge computing architecture and the child task tag attributes of the plurality of child tasks comprising the pending task.

* * * * *